United States Patent [19]

Hoberman et al.

[11] Patent Number: 4,737,981

[45] Date of Patent: Apr. 12, 1988

[54] TELEPHONE CONTROL DEVICE

[75] Inventors: Kenneth H. Hoberman; Kim J. Kirwan, both of Omaha, Nebr.

[73] Assignee: GRH Electronics, Inc., Omaha, Nebr.

[21] Appl. No.: 22,705

[22] Filed: Mar. 6, 1987

[51] Int. Cl.⁴ ...................... H04M 1/72; H04M 15/00
[52] U.S. Cl. ................................... 379/112; 379/355; 379/393; 379/387
[58] Field of Search .............. 379/112, 387, 361, 418, 379/216, 355, 359, 393

[56] References Cited

U.S. PATENT DOCUMENTS 4,459,434  7/1984  Benning et al. ...................... 379/373
4,578,540  3/1986  Borg et al. .......................... 379/387

*Primary Examiner*—Stafford D. Schreyer
*Attorney, Agent, or Firm*—Steven F. Caserza

[57] ABSTRACT

A combination of fixed frequency audio tones and conventional dual tones (as generated by a DTMF telephone set), are used in the autoline control circuit of the invention. All tones are generated by the DTMF telephone set to systematically provide functions available to the subscriber without need for quad conductors in the in-house telephone line and mechanical disconnects. Low cost integration of the present invention into existing FCC tarriffed DTMF equipment and systems without adverse effects is a paramount requirement as the above-mentioned functions are carried out. Conventional jacks and plugs are used to place the parallel autoline circuit of the invention in parallel with the DTMF telephones and the conventional in-premises line connector.

14 Claims, 15 Drawing Sheets

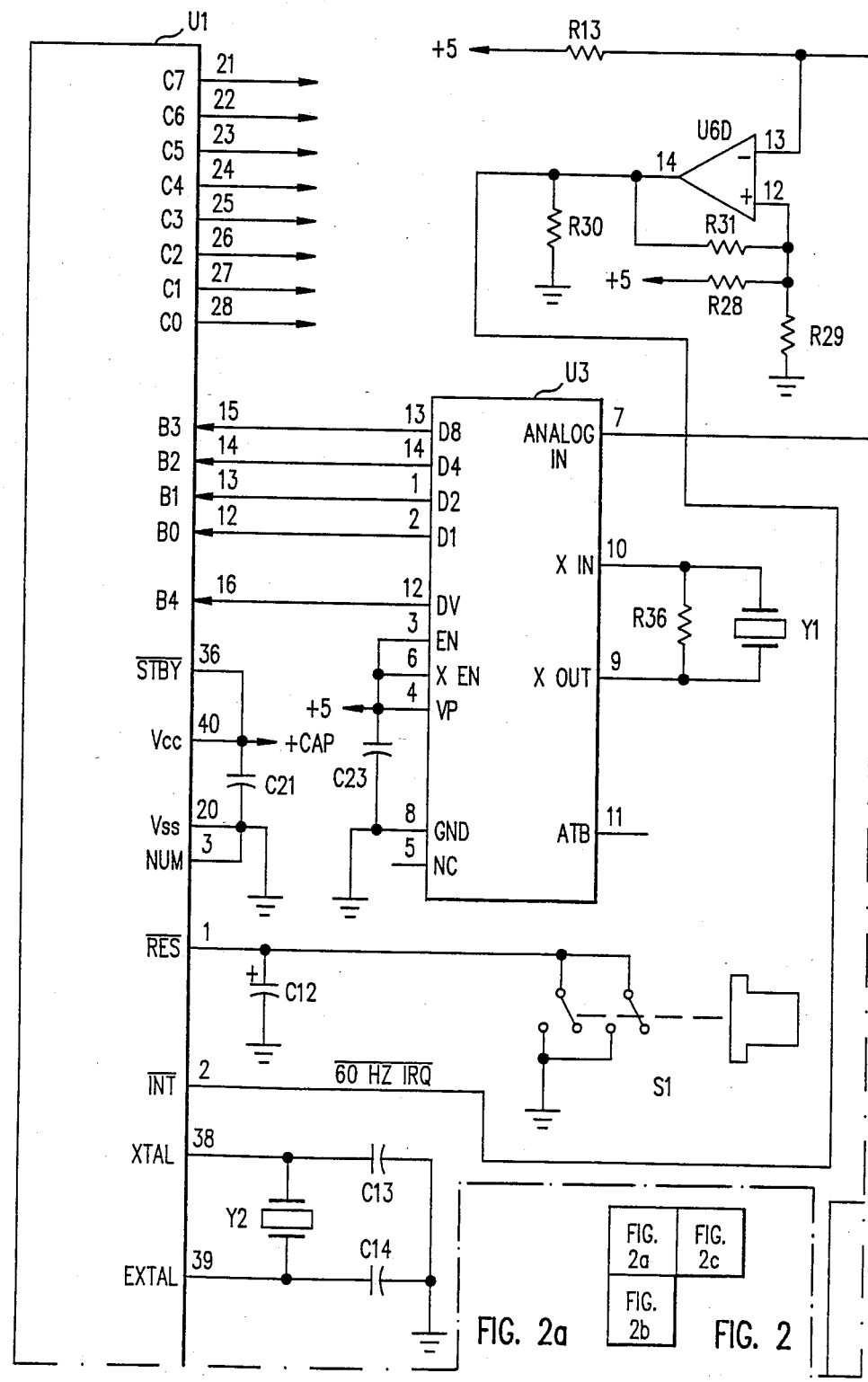

TELEPHONE CONTROL DEVICE

BACKGROUND

1. Field of the Invention

This invention relates to dual tone multifrequency (DTMF) telephone sets in association with local FCC tariffed telephones lines and more particularly to automatic line control circuitry for use by a subscriber in association with such sets.

2. Description of the Prior Art

Tone dialing DTMF telephone sets include a keypad matrix dialer for controlling the generation of dual tones of the FCC tariffed line by depression of a tone key of a 4×3 key pad matrix. Usually four different low frequency tones (from 697 to 941 hz) can be generated by depressing two buttons simultaneously in each of the matrix rows and three different high frequency tones (from 1209 to 1477 hz) can be generated by depressing two buttons simulaneously in each of the matrix columns. Such single tones are within the voice band of the FCC tariffed local line.

Long-distance auto dialing has been described using simultaneous depression of two buttons of the key pad matrix of a DTMF telephone set to initiate and control operations. In U.S. Pat. No. 4,506,116 for "Security Dialing System for Long Distance Telephone Systems", L. J. Genest, issued May 19, 1985), a 1477 hertz tone is generated by depressing the "#" and "9" buttons of a DTMF telephone. As the telephone line is monitored, the tone is detected by a phase locked loop locked at 1477 hertz. A processor then controls a tone generator to automatically transmit the telephone number of a long-distance service on the telephone line by retrieving and executing the stored telephone number from the memory of the processor. A second 1477 hertz tone is used to identify the user's billing code, which is also stored in memory, to more quickly access the long distance telephone service. After the telephone number of the long-distance service and after the user's billing code have been auto dialed, the subscriber still must hand-dial the desired long-distance number. However, such a prior system uses but a single frequency and has minimum flexibility.

While the need to increase the memory size of auto dialers attached to a subscriber's telephone has been recognized, such dialers often require special circuitry or equipment. Also, installation may require modifications beyond the capability of the home user. In U.S. Pat. No. 4,011,414 for "Automatic Dial System For a Subscriber Telephone", W. D. Warren, an auto dialer is described that uses a mechanical switcher to initiate encoding of numbers from a button dialer to the memory of a microprocessor. The microprocessor along with special hardware are stored in a specialized compartment below the dialer. While the button dialer can be mounted on a standard telephone base, the electrical and mechanical connections may be a problem since many different telephone base constructions are presently available.

Increasing the number of functions that can be provided to the subscriber's home telephone set has also been recognized. In U.S. Pat. No. 4,459,434 for "Home Telephone Exchange", G. G. Benning et al, special service circuits are connected to the unused conductors (B and Y) of a quad telephone line and then enabled using command signals on the remaining tip and ring conductors. In that way, chime or other special rings, intercom messaging, voice paging, etc., are provided. A special controller is connected in series in the telephone line before connection with its usual cable connector. In one instance when the ringer of the set is enabled, the subscriber's in-premises line is first disabled. Then a local battery is applied to the in-premises line. Special ringers can be activated that bypass the usual ringers of each telephone set. When the subscriber answers the ring by placing the telephone set off-hook, the controller reestablishes contact by monitoring loop DC current after disconnecting the tone generator and local battery from the line. In another instance, a hold function is established by a series of off-hook signals. After insertion of a terminating resistor up-line for maintaining an off-hook condition, the in-premises tip and ring lines are disabled. Further flashing of off-hook signals reverses the procedure. In yet another instance, off-hook flashes followed by a dual tone or rotary dial pulse (not in the audio range) are used to activate special circuits that can include an amplifier in series with a microphone for voice paging, through a special signaling circuit. A DTMF circuit is used to recognize the dual tones, while a loop current detector detects the rotary tone pulse. After the CPU of a microcomputer disables the in-premises line based on the off-hook DC flashes, the nonaudio tones are used to control the CPU. Commands of the CPU activate the service circuit. But a separate special signaling circuit must be used since the service circuit must be enabled through the B and Y leads. In yet another instance, the controller is placed in parallel with the in-premises line but each service circuit and telephone set is provided a separate switching network. Commands to the special circuits still pass via the B and Y lines. Hence a special signaling circuit is still a requirement to selectively disable and enable such elements relative to the in-premises line.

The above-mentioned modifications may be beyond a subscriber's installation capability, especially where such modifications must be connected in up-line from the subscriber's in-premises mating connector. The circuits themselves may adversely affect usual telephone operations. For example, line disconnects by in-premise electro-mechanical switches are not encouraged on FCC tariffed lines. Line load can vary. Voltage spikes can also occur and be passed up-line to the central office and its switching equipment. Introducing an in-premises d.c. voltage source may not be compatible with operating requirements of existing equipment. Special signal circuits for the B and Y lines further complicate proposed operations, as where a quad line is unavailable, or where the B and Y leads are already in use for another purpose, such as a secondary line. Speed dialing is not inherent in such circuitry; the subscriber must still purchase a separate speed dialer.

Prior art memory-dialers were used in series, either one dialer per telephone, between each telephone set and its wall jack, or, one dialer per telephone line, between all telephones and the telephone company line. Series connection was required to isolate the telephone from the telephone company line, since any tone-dialing telephone push-button used in the usual way to operate the dialer would also trigger telephone company systems. There are two general prior art solutions to this problem.

The first method requires that the memory dialer have its own separate keyboard to store or recall numbers. This eliminates any possible interference with the telephone company equipment, since the keyboard signals do not appear on the telephone line. In addition, simple parallel hookup is possible. The disadvantage, however, is that the memory dialer can only be operated from the single location where it is located, leading to a requirement for one dialer per telephone.

The second method requires that the memory dialer be designed with two isolated "halves" which can be connected internally and automatically, at appropriate times. The two "halves" of the dialer are connected between the telephone and the telephone company using a four-wire series hookup, so that the telephone pushbuttons can be used in isolation in the usual way to cause the "telephone company side" of the device to select and dial a previously stored number. After dialing, the "customer side" of the device is connected to the "telephone company side" by an internal "pass-thru" connection. With this method, it is possible to provide memory dialing on all telephones, but only if the dialer is installed between the telephone company line and all telephones using the inconvenient "series" method of connection.

Thus no prior art method exists for providing memory dialing for all telephones on one telephone line, with one device using simple "parallel" connections.

Some functions were available in the prior art via separate devices. Prior art "whole-house" memory dialers require "series" connection, as described previously. Prior art "hold" devices after offer parallel connection, but not other features except "hold". An alarm clock could be used as a reminder to place a call, but it would not dial the call automatically. A timer could be used to time the length of calls but it would not start automatically when the user picks up the telephone or reset automatically when the user hangs up the telephone receiver. Paging systems using buzzers, chimes, etc., are available but do not use the existing telephone wiring and thus require their own separate wiring system.

As described previously, providing automatic dialing for every telephone on one line requires either inconvenient series connection between the telephones and the telephone company, or, one memory dialer per telephone connected in series with each telephone. Prior art memory dialers do not provide conversion of all tone-dialing telephones on one telephone line to memory dialing with a simple parallel connection to one telephone jack.

Additionally, no known device currently available offers all of the features available in this one invention by any other method, evey by using an unwieldy assortment of various devices.

SUMMARY

In accordance with one aspect of the present invention, a combination of fixed frequency audio tones and conventional dual tones (as generated by a DTMF telephone set), are provided for use in the autoline control circuit of the invention. The fixed frequency single audio tone has a selected frequency range from 697 to 941 hertz (low group) and from 1209 to 1477 hertz (high group). All tones are generated by the DTMF telephone set to systematically provide functions available to the subscriber without need for quad conductors in the in-house telephone line and mechanical disconnects. In accordance with another aspect of the present invention, two or more of the following functions are easily provided, viz.:

(i) automatic redialing; (ii) automatic speed dialing, (iii) paging, (iv) hold of an incoming call with and without external audio, (v) synchronized paging and hold with audio signaling at a remote location, (vi) programmable scheduling of callbacks, (vii) cumulative audio timing of calls and of the hold period in (iv), supra, (viii) programming the extent of time periods and related to circuit response to single tones after off-hook occurs, and (ix) automatic oppressive high noise generator to discourage obscene calls ("howl" option).

Low cost integration of the present invention into existing FCC tarriffed DTMF equipment and systems without adverse effects is a paramount requirement as the above-mentioned functions are carried out.

Installation is simple. Conventional jacks and plugs are used to place the parallel autoline circuit of the invention in parallel with the DTMF telephones and the conventional in-premises line connector. Operations are also simplified. The subscriber uses the DTMF telephone to generate the single and dual tones to operate functions (i)-(ix) set forth above. A multi-use, multi-db level tone generator provides for internal line timing signals, loud "howls" to discourage obscene callers, as well as for redial of last-called numbers and speed dialing of stored local and toll numbers. Since the DTMF set remains in connection with the in-premises line during all off-hook conditions, the fixed frequency single tone detectors are provided with notch filters to reject conventional dial tones and provide needed transparency.

In more detail, the autoline circuitry of the present invention includes:

parallel connector and signal enhancing means for connection in parallel with a subscriber's tone-dialing DTMF telephone set and a conventional in-premises connector, said in-premises connector being connected to remote switching equipment by a conventional FCC tariffed telephone line comprising tip and ring conductors, two-tone detector and a single tone detector, each connected to the connector and signal enhancing means through a dial-tone filter and d.c. isolator for decoding dual-tones and fixed frequency single tones compatible with the FCC tariffed telephone line, an off-hook detector also connected to said connector and signal enhancing means to selectively detect off-hook DC current, a parallel load holding circuit also connected to said connector and signal enhancing means for selectively providing an off-hook local loop transparent condition even though the subscriber's telephone set is on-hook, a selectively controlled inline multi-use multi-db level tone generator connected to said connector and signal enhancing means, an external audio signal generator, a processor circuit for assimilating data from the dual-tone and single tone detectors and the off-hook detector and controlling the inline tone generator, the audio signal generator, and the load holding circuit in response thereto, to provide the functions listed above without affecting said local line switching and tone generating equipment, a DC power supply including a power transformer in which the secondary coil is of split construction having a grounding terminal connected via a polarity correcting diode bridge to the tip conductor of the FCC tariffed line whereby isolation is enhanced, and a separate remote circuit connected to parallel with the phone company line at another location, said remote circuit including separate parallel connector and enhancing means, a separate processor circuit for monitoring the in-premises telephone line for dual frequency tones only, and a DC power supply, said separate processor connected to and controlling a second external audio signal generator as required for signaling, paging or hold functions.

DETAILED DESCRIPTION

General Overview

Figures 1, 1A:
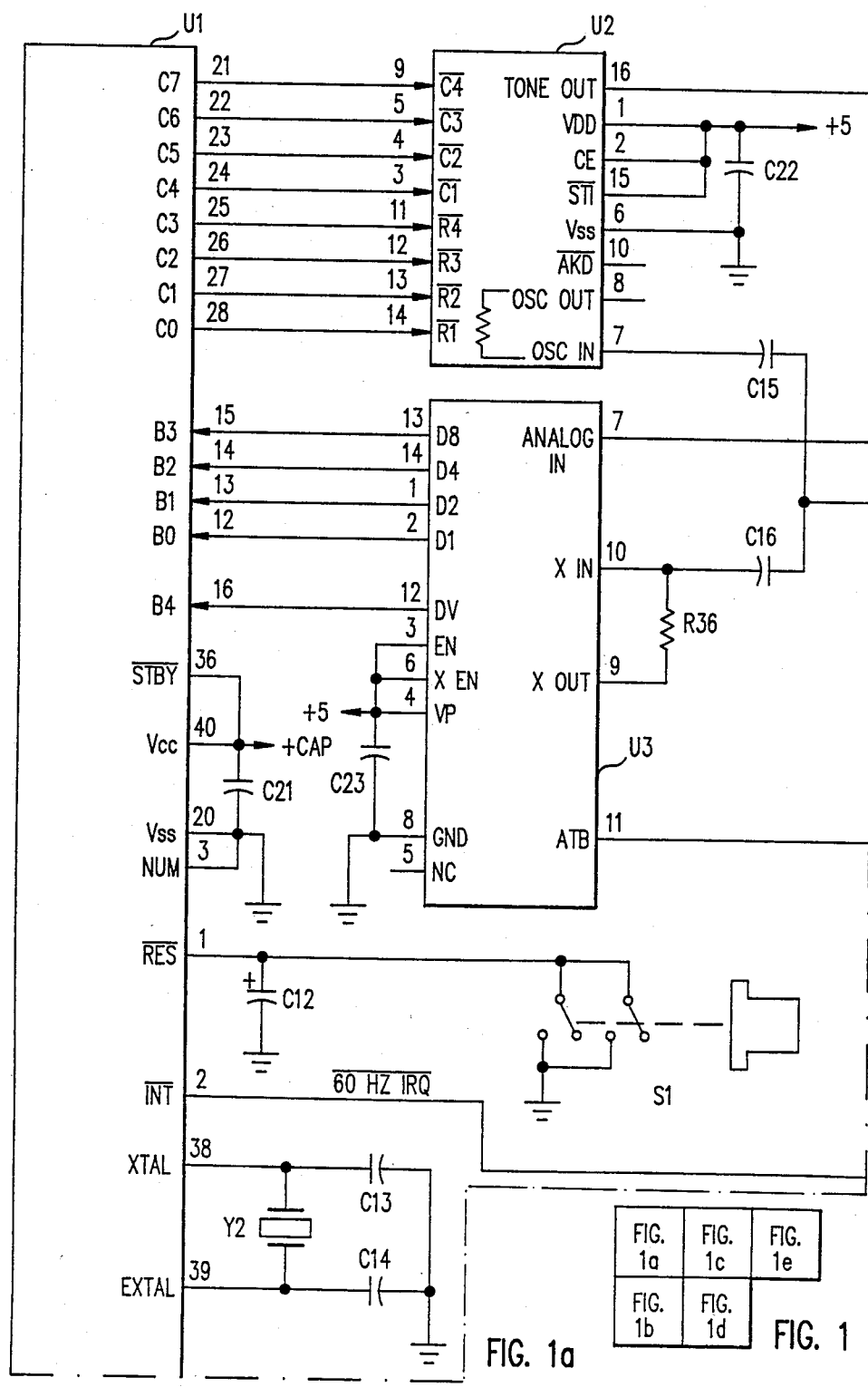
FIG. 1 is formed by FIGS. 1a–1e and is a schematic diagram of one embodiment of a telephone control system constructed in accordance with the teachings of this invention.
Figure 1B:
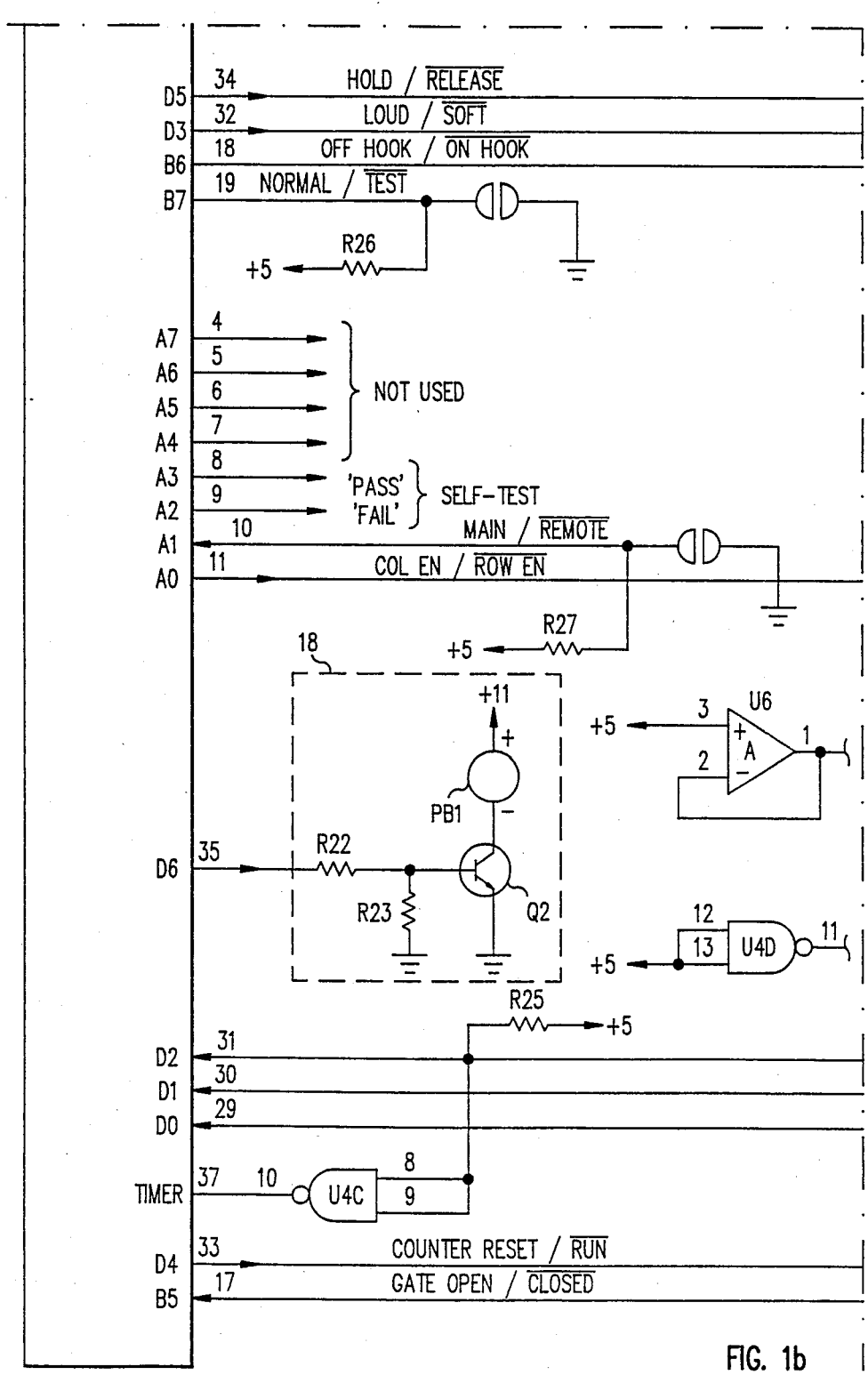
Figure 1C:
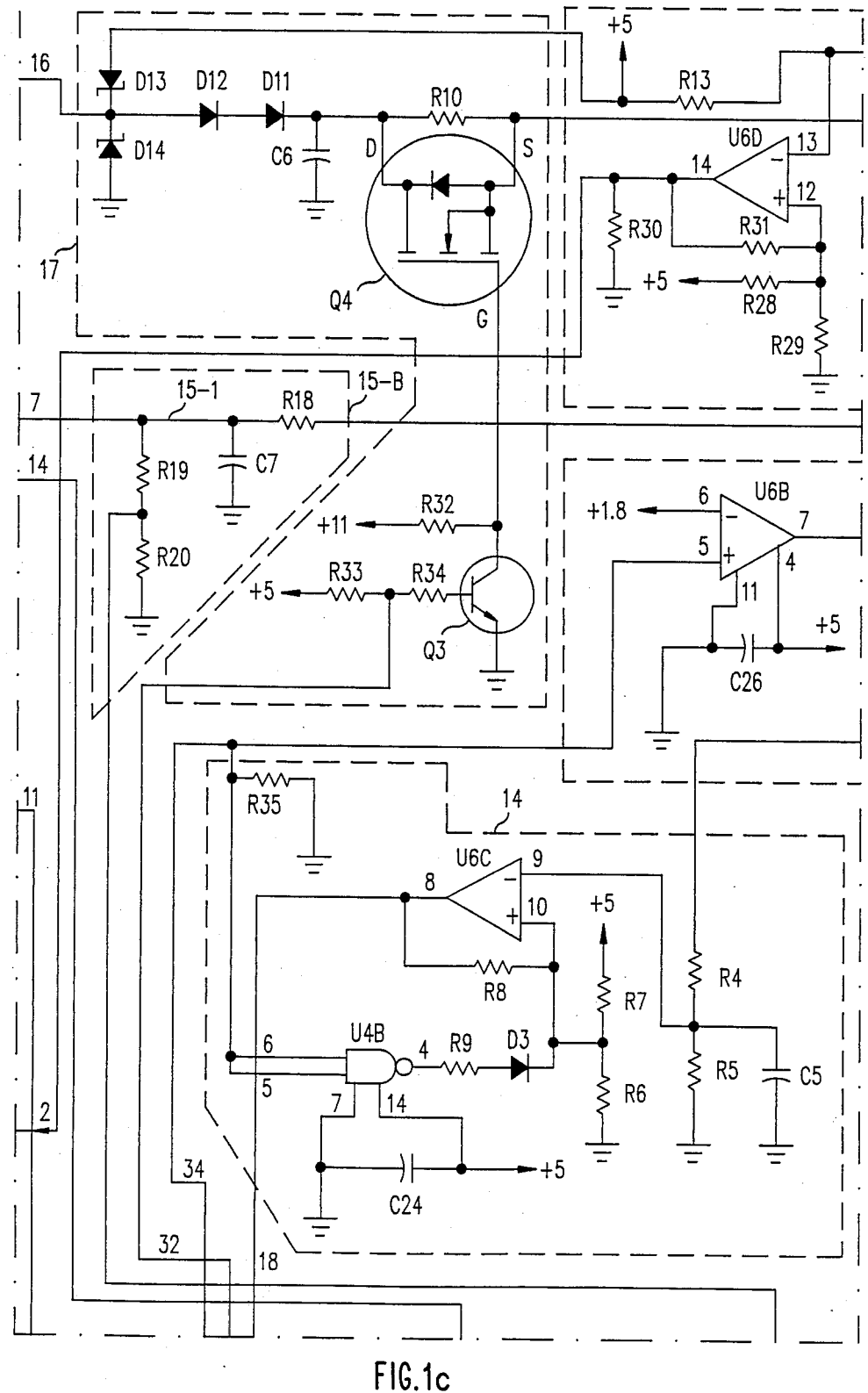
Figure 1D:
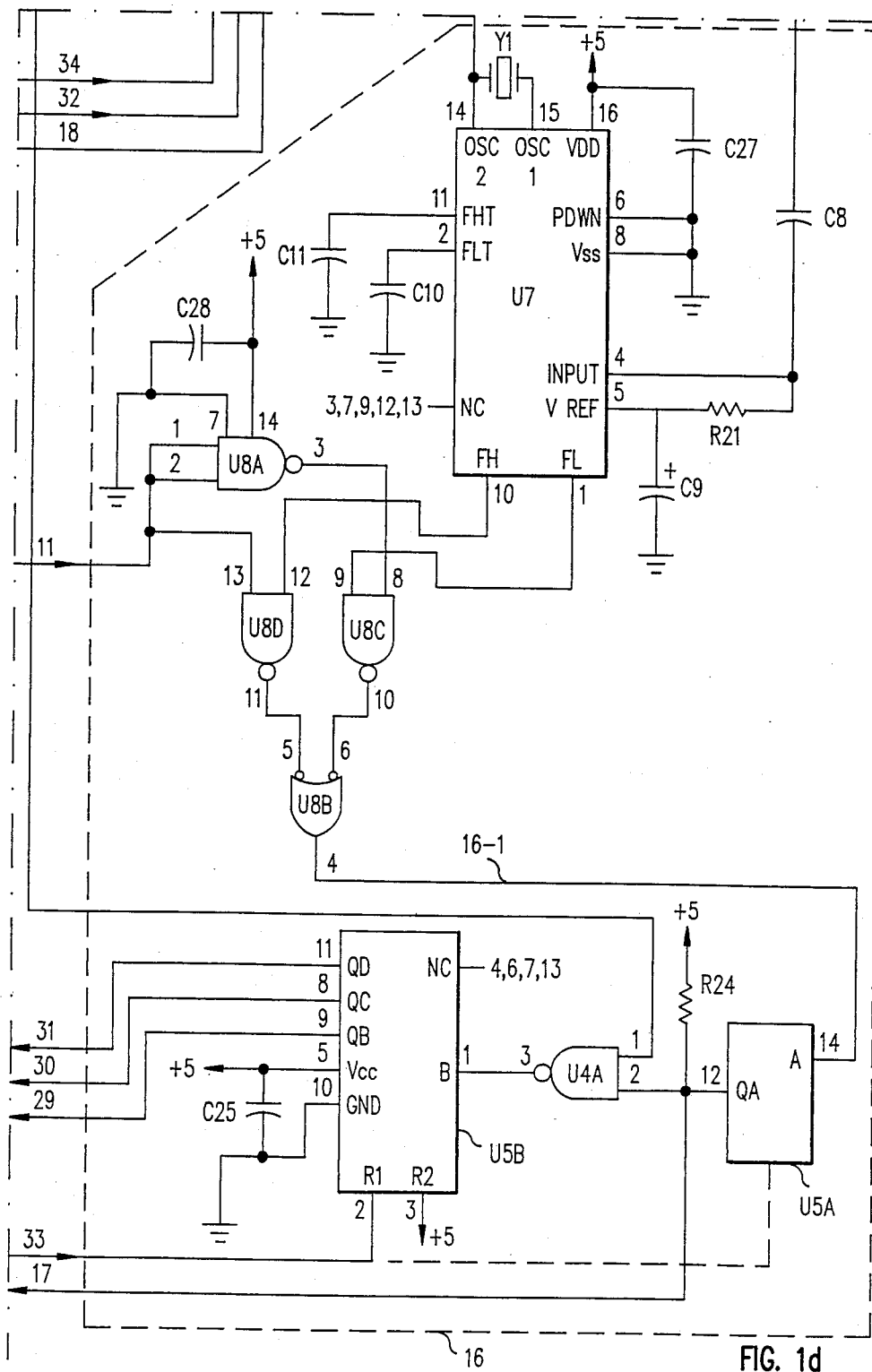
Figure 1E:
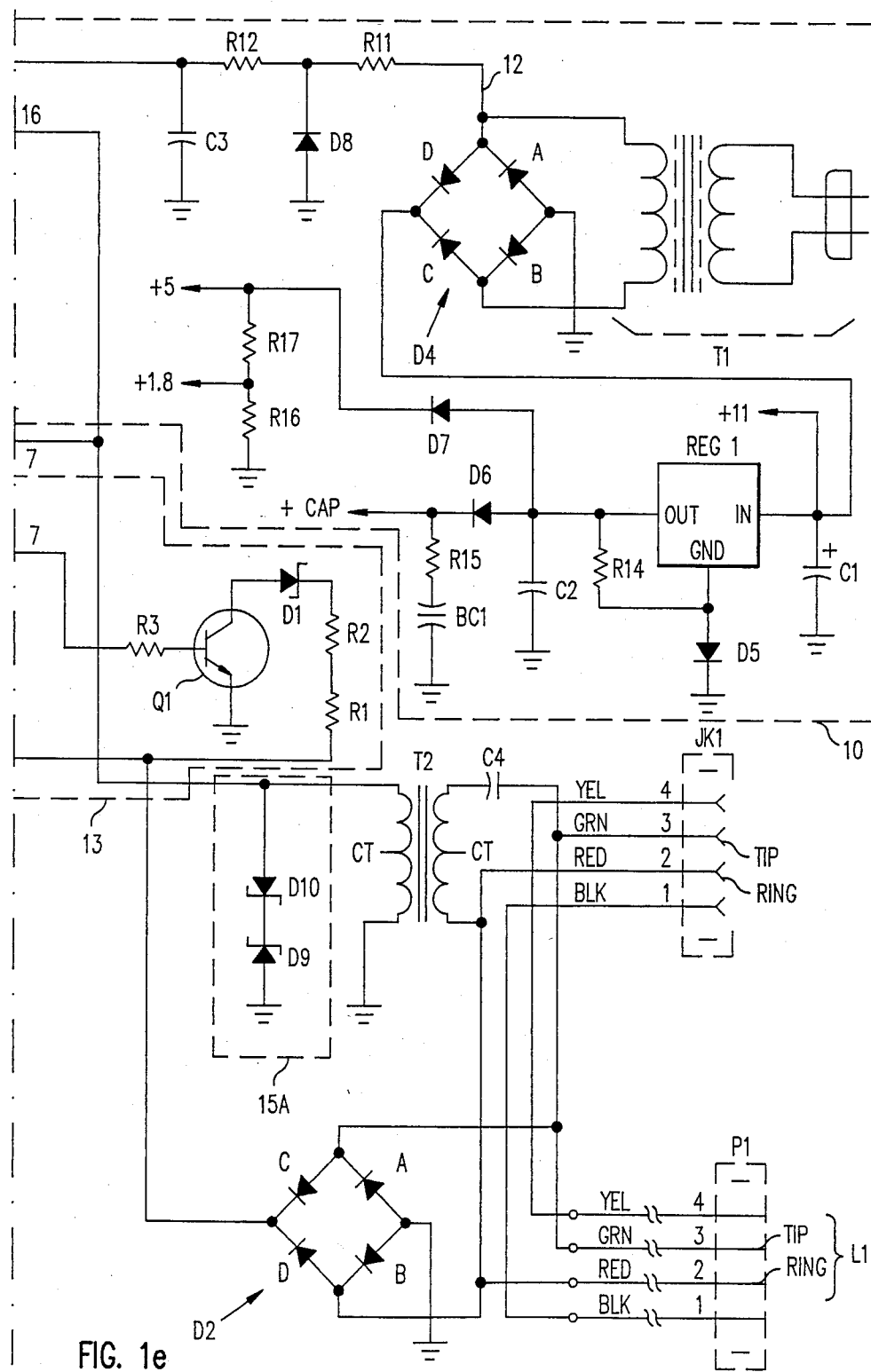

The principal functions of the invention are summarized in the following paragraphs. This section is written to highlight the features of one embodiment of the invention (hereinafter "the device").

The connector and signal enhancing means includes a male plug for connection to tip and ring conductors of the local line, a female jack for connection to the tip and ring conductors of the telephone set, a primary coil of a DC isolation transformer having terminals connected to said tip and ring conductors through a coupling capacitor, a full wave bridge connected between said tip and ring conductors parallel to said DC isolation transformer, a secondary coil of said isolation transformer series connected to each of said parallel dual tone detector, single tone detector, and tone generator through a voltage limiter and separate first, second, and third signal enhancement means, respectively, said first enhancement means including RC signal filter and a common attenuator, said second enhancement means including said common attenuator and another RC signal filter, said third enhancement means including a spike attenuator, blocking diodes to provide an high impedance to the tip and ring conductors when the signal generator is disabled, and a selectable resistance network to selectively vary the db level of the output signal of the audio generator.

A dual-tone tone detector permits the device to recognize ordinary dual-tone signals generated by pressing buttons of the telephones connected to the telephone line. The dual tone detector has three main purposes: (1) To recognize telephone numbers as they are dialed, for possible automatic redialing at a later time. (2) To recognize any other miscellaneous commands as may be required. (3) To recognize numeric input data as may be required by miscellaneous commands.

A single-tone tone detector serves two main purposes: (1) To permit the device to recognize commands which will not be recognized by telephone company equipment at the central office end of the line. (2) To permit the device to recognize more commands than are otherwise possible using standard tone-dialing telephones with twelve button keyboards.

The device is able, upon command, to automatically dial telephone numbers that have been previously stored in specific storage memories for later use.

A "hold" circuit is provided so that users of the device who have two or more telephones on their line may put a caller on "hold", hang up the first telephone, and go to another telephone to pick up the call again. The caller hears a soft beep sound periodically as confirmation that he is still on hold.

The device has an automatic call-length timer which is reset when the user's telephone is hung up, and starts timing (in minutes) when the user picks up the telephone to make a call.

An alarm timer is provided which is programmed by the user in one minute increments up to 99 hours and 99 minutes. Two alarm options are available: (1) the user may have the alarm sound audibly for 30 seconds maximum but reoccur for another 30 seconds at the next interval, and (2) the user may have the alarm sound continuously until the user responds, but after the user responds, self-cancel and not reoccur. When the alarm occurs, the user has three options: (1) Silence the alarm and abort automatic dialing of the programmed number. (2) Silence the alarm and allow automatic dialing of the programmed number to proceed. (3) Not respond to the audible alarm and allow it to expire in 30 seconds (if the 30-second option was used). The primary purpose of the alarm timer is to dial calls when a preset time occurs.

A "paging" feature is provided for use in conjunction with the "hold" feature. When a caller would like to speak with someone other than the party who answered the telephone, the "paging" feature allows the caller to be put on hold while a uniquely identifiable audible signal is sent from the device, so that by prearrangement, a specific party can be summoned to the telephone. The uniquely identifiable audible signal is duplicated and sounded by the remote signaling accessory.

The remote signaling accessory is an optional auxiliary device for use in cases where the paging feature is desired but the main device is too far away to be heard at the other telephone locations. The accessory uses the telephone wiring to receive the paging command sent by the users telephone set.

The device also provides a "howl" feature, a command that causes the device to make an annoying sound on the telephone line to discourage obscene telephone calls.

A redial last number feature is provided as a convenience to the user. Every telephone number dialed by the user is stored temporarily for possible redialing upon user command. When the user dials another telephone number, it replaces the previous number in temporary memory.

The device takes advantage of the ability of most tone-dialing telephones to generate "single-tones" when any two pushbuttons in the same horizontal row or vertical column are depressed. Most users have very little difficulty adjusting to pressing two buttons at once, and with a little practice can press two buttons with the same ease as one. Useful functions are added to every telephone on one telephone line while at the same time operating by simple parallel connection to the telephone line, without requiring the more difficult series connection between the telephones and the telephone company line. These useful features are made available on most existing tone-dialing type telephones, without any requirement to replace or upgrade existing telephones.

CIRCUIT DESCRIPTION

One embodiment of this invention (FIG. 1) includes five subcircuits:
(1) Power Supply Circuits
(2) Telephone Line Interface Circuits
(3) Audio Input Circuits
(4) Audio Output Circuits
(5) Miscellaneous Circuits

POWER SUPPLY CIRCUITS

Power supply 10 includes AC input transformer T1 which has, for example, a 120 VAC primary and a 10.3 VAC at 175 mA secondary. The primary terminals are in the form of two metal prongs as would be required for insertion into an ordinary 117 VAC outlet as used in North America. The secondary terminals are for printed circuit board mounting.

The secondary side of transformer T1 powers a full wave bridge rectifier D4 with capacitive filter C1 to develop an unregulated DC source of about +11 volts. This voltage is regulated down to +5.7 volts by the combination of +5.0 V regulator REG 1, diode D5, and resistor R14. Capacitor C2 provides transient filtering. The +5.0 V supply is obtained from the +5.7 V source via diode D7.

In a similar fashion, a second +5.0 V supply +CAP is obtained from the +5.7 V source via diode D6. This second +5.0 V supply also contains a large value capacitor BC1 (typically 0.047F) which serves as a so-called backup capacitor. Back-up capacitor BC1 supplies current to only microprocessor U1 during power-off periods for a number of hours. Worst case charging and discharging current of backup capacitor BC1 is limited by resistor R15. At room temperature, backup capacitor BC1 allows the memory of microprocessor U1 to retain information for a minimum of six hours, and more typically for three days.

60 HZ INTERRUPT

A 60 Hz clock is derived from a pulsating positive DC waveform obtained from power transformer T1 and node 12 of bridge rectifier D4. The pulsating DC waveform is sent via resistor R11, diode D8, resistor R12, and capacitor C3 to the input lead of voltage comparator with hysteresis U6D. The resulting TTL-compatible output signal of comparator U6D is applied to the interrupt lead of microprocessor U1. This provides microprocessor U1 with a 60 Hz timing reference for two purposes: a time reference for timers, time-of-day, pauses, etc.; and lack of 60 Hz pulses indicates loss of AC power.

TELEPHONE LINE INTERFACE CIRCUITS

The telephone line interface L1 includes seven main sections: Telephone Line Connection via plug P1, Audio Isolation Transformer T2, Reverse-Polarity Bridge D2, hold circuit 13, On-hook/Off-hook Detector 14, and Phone Line Jack JK1.

The connection from the telephone line L1 is made via a 6-foot cable with modular plug P1. This provides a simple parallel connection and is the only connection necessary to the telephone line.

The telephone line jack on the side of the device is provided for convenience only, so that the device can always be installed even when all the telephone jacks on that line are already in use. Because of this feature the customer need not buy a so-called Y-adaptor. This jack is an "extra" parallel connection to the telephone line and does not indicate that a telephone must be plugged into the device or that the device must be installed in series with a telephone. One of the chief features of this invention is that it may be installed in parallel with the telephone line via any unused jack. This invention does not use series isolation of a telephone from the telephone company.

Audio isolation transformer T2 is used to isolate the telephone line from the device circuitry. Transformer T2 has an impedance ratio of 600 ohms to 600 ohms, to provide optimum matching between the typical telephone line impedance and the device circuitry. The telephone-line-side winding of transformer T2 is capacitively coupled to telephone line L1 by DC blocking capacitor C4, to prevent the device from keeping the telephone line off-hook when all the telephones on the telephone line are on-hook.

Bridge rectifier D2 consisting of diodes D2A-D2D ensures that the device will operate even if the polarity of the telephone line L1 "tip" and "ring" leads have been inadvertently reversed. Thus the Hold Circuit and the On/Off Hook detector will always be connected to the telephone line in the correct polarity.

Hold Circuit 13 consists of a telephone line load formed by load resistors R1, R2, and 12 V zener diiode D1, which is switched on or off telephone line L1 via diode bridge D2 by switching transistor Q1 in response to the HOLD/RELEASE output signal from microprocessor U1 applied to operational amplifier U6B. When the series combination of resistors R1, R2, and diode D1 is applied to telephone line L1, and all telephones are on-hook, the telephone company equipment will continue to detect an off-hook current while the voltage across telephone line L1 rises above 12 volts, for example, to 16 volts. When one telephone is again placed in use by being taken off-hook, the voltage on telephone line L1 decreases, for example, to 6 volts. By providing a first voltage on the telephone line when a telephone is actually off-hook and a second voltage on the telephone line when all telephones are on-hook but the hold circuit load is placed on line, the telephone company equipment is prevented from disconnecting during off-hook and hold periods, while still allowing the device to detect the off/on hook condition of telephones connected to the telephone line in parallel with the device.

The "hold" load formed by diode D1 and resistors R1 and R2 is applied to telephone line L1 when transistor Q1 conducts. The base of transistor Q1 is driven by operational amplifier U6B used as a non-inverting amplifier. Thus transistor Q1 is in the "hold" mode when a high TTL signal is applied to the non-inverting input lead of operational amplifier U6B, and is in the "release" mode when a low TTL signal is applied to the non-inverting input lead of operational amplifier U6B.

On-hook/Off-hook detector 14 consists of voltage level comparator with hysteresis U6C whose inverting input lead is connected to a voltage divider formed by resistors R4 and R5 having resistor R4 connected to the tip lead of telephone line L1 via diode bridge D2, and resistor R5 connected to the ring lead of telephone line L1 via the ground connection of diode bridge D2. Transient suppression is supplied by capacitor C5. Resistor R4 (22 megohms) ensures that the on-hook resistance of the device will exceed 10 megohms. Voltage comparison is performed by resistors R6–R8. The voltage trip point of comparator U6C is switched by NAND gate U4B, resistor R9, and diode D3 in response to the HOLD/RELEASE signal from microprocessor U1. In the non-hold (release) mode, the input signal applied to NAND gate U4B is low so the output signal of NAND gate U4B is high. This high output signal of NAND gate U4B is connected to the noninverting input lead of comparator U6C through resistor R9 and diode D3 to raise the threshold of voltage comparator U6C to about 36 volts. Conversely, in the hold mode the input signal to NAND gate U4B is high, the output signal from NAND gate U4B is low, and diode D3 is reverse biased so that resistors R6, R7, and R8 alone set the threshold voltage of comparator U6C to about 12 volts.

Thus, the hold load state and the hook comparator trip point state is changed by a single HOLD/RELEASE control output signal from microprocessor U1.

AUDIO INPUT CIRCUITS

The audio input circuits include Audio Input Limiter/Filter/Attenuator 15, Dual-Tone Detector 16, and Single-Tone Detector 17.

Audio Input Limiter/Filter/Attenuator 15

The audio signal across telephone line L1 is capacitively coupled through capacitor C4 to the telephone line side of transformer T2. The telephone signal appears on the device side of transformer T2 and is voltage limited by limiter 15A formed by zener diodes D9 and D10. The audio signal is applied to attenuator/low pass audio filter 15B (2.6 kHz) with dual output leads consisting of resistors R18, R19, and R20, and capacitor C7. The higher level audio output signal of attenuator/low pass filter 15B is applied via lead 15-1 to the input lead of DTMF detector U3. The lower level audio output signal is applied via coupling capacitor C8 to the input lead of DTMF bandsplit filter U7, which is part of the single-tone detector.

When DTMF tones are not being generated by DTMF generator U2, the output signal of DTMF generator U2 is near zero volts DC. Diodes D11 and D12 prevent loading of the low-level incoming audio signal by the idle output of DTMF generator U2. Loading is further reduced by keeping Q4 (discussed later) in the "open" state except when needed.

In order for this device to provide "whole-house" service from a simple parallel connection, the device is capable of responding to either DTMF signals or single-tone signals while a dial-tone signal is present. Since the dial tone will interfere with reception of the desired single-tone and dual-tone signals, the dial tone must be removed by some means. This could be done by pre-filtering the incoming audio, that is, using a dial-tone-reject/DTMF-audio-accept filter ahead of the single-tone and dual-tone detectors. In one embodiment, DTMF detector U3 and DTMF bandsplit filter U7 each have their own built-in dial-tone-reject filters.

Dual-Tone Detector U3

Dual-tone DTMF detection is performed by a single monolithic integrated circuit U3 with very few external components. Incoming audio signals from audio input limiter/filter/attenuator 15 are applied via lead 15-1 to the input lead of DTMF detector U3. When a valid dual-tone signal is detected, DTMF detector U3 informs microprocessor U1 via a "digit valid" output signal and provides a 4-bit binary output signal indicating which of 16 possible digits has been detected. All necessary timing and frequency measurements for correct dual tone detection are performed by DTMF detector U3 based on a clock signal supplied to it, which will be discussed later.

Single-Tone Detector 16

Incoming audio signals from audio input limiter/filter/attenuator 15 are sent to the single-tone detector 16, which includes DTMF bandsplit filter U7. DTMF bandpass filter U7 is a monolithic digital integrated circuit which separates a DTMF signal into its high group frequency and low group frequency components.

DTMF bandsplit filter U7 provides two digital output signals, FL for the low group tone and FH for the high group tone. In this embodiment only one single-tone detector is provided; however, in an alternative embodiment two separate single-tone detectors are provided, thus eliminating the need for dual tone detector U3. The two output signals FL and FH from DTMF bandsplit filter U7 are selected in sequence by gates U8A, U8B, U8C, and U8D under control of the COLUMN ENABLE/ROWENABLE output signal of microprocessor U1, in order to alternately sample high group and low group output signals in search of an in-band, valid single tone frequency. Once such an acceptable frequency is found, the high/low (column/row) toggling is stopped and the appropriate output signal is repetitively sampled in search of a minimum-duration, in-band valid single tone. Loss of the valid single-tone frequency reinitiates the high group/low group sampling process.

The output signal of gate U8B is applied via lead 16-1 to the input lead of divide-by-two counter U5A which serves as a period gate. The output signal of divide-by-two counter U5A is a square wave with 50% duty cycle, high for one period and low for one period of the audio signal on lead 16-1. The output signal of divide-by-two counter U5A is used to enable a high frequency clock applied to an n-bit counter, thus providing a digital period measurement of the incoming single frequency tone (FL or FH).

Increases and decreases in clock speed and number of counter bits involve tradeoffs between higher resolution and increased complexity of analysis versus lower resolution and decreased complexity of analysis. This embodiment utilizes a binary counter of 11 bits in length, and a high frequency clock of approximately 447 kHz. Alternative embodiments accomplish the above digital period measurement without using a divide-by-two counter, by a more complex technique using input-capture counters or interrupt-triggered-read counters, so that a measurement can be obtained every period instead of every other period.

The 11-bit binary counter consists of an 8-bit binary counter internal to microprocessor U1, and external 3-bit binary counter U5B. When the output signal of divide-by-two counters U5A is high, NAND gate U4A is enabled, thereby allowing the high frequency clock applied to one input lead of NAND gate U4A from two-tone decoder U3 to increment 3-bit counter U5B, representing the 3 least significant bits of the 11-bit counter. When 3-bit counter U5B carries (from 111 to 000), inverter U4C sends one rising edge pulse to the input lead of the 8-bit event counter internal to microprocessor U1, thereby incrementing the 8 most significant bits of the 11-bit counter. The counting process continues until the output signal of period gate U5A gets low, disabling NAND gate U4A, after which no more counts are allowed to accumulate.

While the count is accumulating when the output signal of period gate U5A is high, microprocessor U1 polls the state of period gate U5A. As soon as microprocessor U1 detects that the output signal of period gate U5A has gone low, microprocessor U1 reads and resets its 8-bit internal counter and reads external 3-bit counter U5B. The two readings are combined by microprocessor U1 to provide an 11-bit result. Microprocessor U1 also applies a high COUNTER RESET/RUN signal to external counter U5B. When external counter U5B is reset, divide-by-two counter U5A is also reset due to internal connections in binary counter U5 (in this embodiment a 74LS93 device manufactured by Texas Instruments and others); but, since external counter U5A was already cleared, no change occurs in the count of U5A.

Microprocessor U1 checks the 11-bit result against possible valid DTMF single tone periods to determine if the period measured was within the limits for a valid single tone. Microprocessor U1 makes further checks to determine how many of the most recently measured periods were valid vs. how many were invalid before declaring that a valid single tone has been detected.

AUDIO OUTPUT CIRCUITS

The audio output circuits include Audio Output Level Control 17 and the Audio Generator.

Audio Output Level Control 17

The device side of the audio coupling transformer T2 is driven by DTMF generator U2 via diodes D12 and D11 and the parallel combination of resistor R10 and power FET Q4. When a DTMF tone is generated, the output signal of DTMF generator U2 is at an average DC level, causing diodes D12 and D11 to conduct, carrying the audio signal to the drain of FET Q4. Capacitor C6 provides smoothing of the digitally generated audio signal and transient suppression. Diodes D13 and D14 provide transient voltage protection at the output lead of DTMF generator U2.

Power FET Q4 is set by the microprocessor to a conducting or non-conducting state. When conducting, FET Q4 has a very low drain to source resistance (approximately 3 ohms), and when non-conducting has a very high drain to source resistance (several megohms). In order to place a low volume tone onto telephone line L1, microprocessor U1 turns off FET Q4 so that the audio signal driving isolation transformer T2 must pass through resistor R10, reducing the amount of current in the device-side winding of isolation transformer T2 and therefore reducing the volume of the signal applied to telephone line L1. Conversely, in order to place a high volume tone onto telephone line L1, microprocessor U1 turns on FET Q4 so that the parallel combination of FET Q4 and resistor R10 increases the amount of current in the device-side winding of isolation transformer T2 and therefore increases the volume of the signal applied to telephone line L1. Transistor Q3 and resistors R32, R33, and R34 provide the wide DC voltage swing needed to operate FET Q4 in response to the LOUD/SOFT output signal from microprocessor U1.

Audio Generator

Generation of audio signals for application to the telephone line is accomplished by DTMF generator U2, which is controlled by microprocessor U1 and is capable of generating both DTMF dual-tone signals and DTMF signal-tone signals by appropriate data applied to its input leads by microprocessor U1.

Piezo Buzzer Circuit 18

While most of the audio signals generated are for application to telephone line L1, there are times when an audible signal is needed which can be heard even though the telephone is hung up, such as for alarm-timers, paging functions, etc. For this purpose, an audible piezo buzzer PB1 is provided which is turned on and off by microprocessor U1 via transistor Q2, and resistors R22 and R23.

Clock Oscillators

The clock oscillator for DTMF Generator U2 and DTMF Detector U3 must be supplied by a highly accurate and stable source, in order to guarantee correct generation and detection of audio tones. For this reason, quartz crystal Y1 is used with Bandsplit Filter U7, which has a built-in oscillator circuit for use with quartz crystals and which is able to drive external loads. Thus, the crystal oscillator circuit of Bandsplit Filter U7 including crystal Y1 also drives DTMF Detector U3 and DTMF Generator U2. This clock signal is also divided by eight by DTMF Detector U3 to provide on lead 11 of DTMF Detector U3 a second clock signal of approximately 447 kHz which, as previously described, serves as the high frequency clock used in the period measurement of single-tones.

Microprocessor U1 requires another independent oscillator so that microprocessor U1 can power-up and power-down correctly while operating on the back-up voltage provided by back-up capacitor BC1. The requirements for stability in this oscillator are also high, but the requirement for accuracy is somewhat relaxed. For this reason, Y2 is a ceramic resonator, but a quartz crystal can be substituted at increased cost. Capacitors C13 and C14 complete the microprocessor oscillator circuit.

Remote Signalling Unit

Figure 2B:
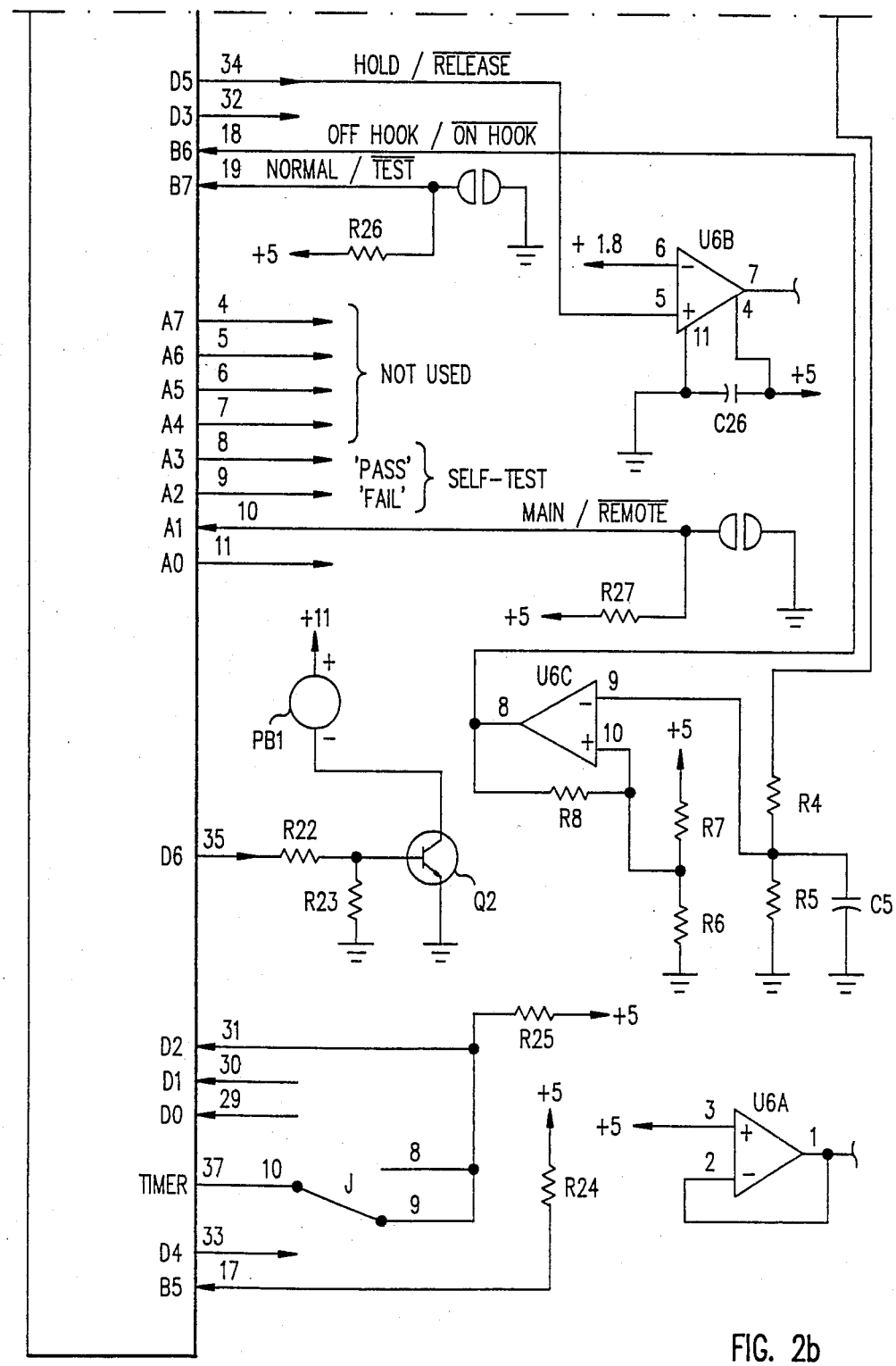
FIG. 2 is formed by FIGS. 2a–2c and is a schematic diagram of one embodiment of a remote unit constructed in accordance with the teachings of this invention.
Figure 2C:
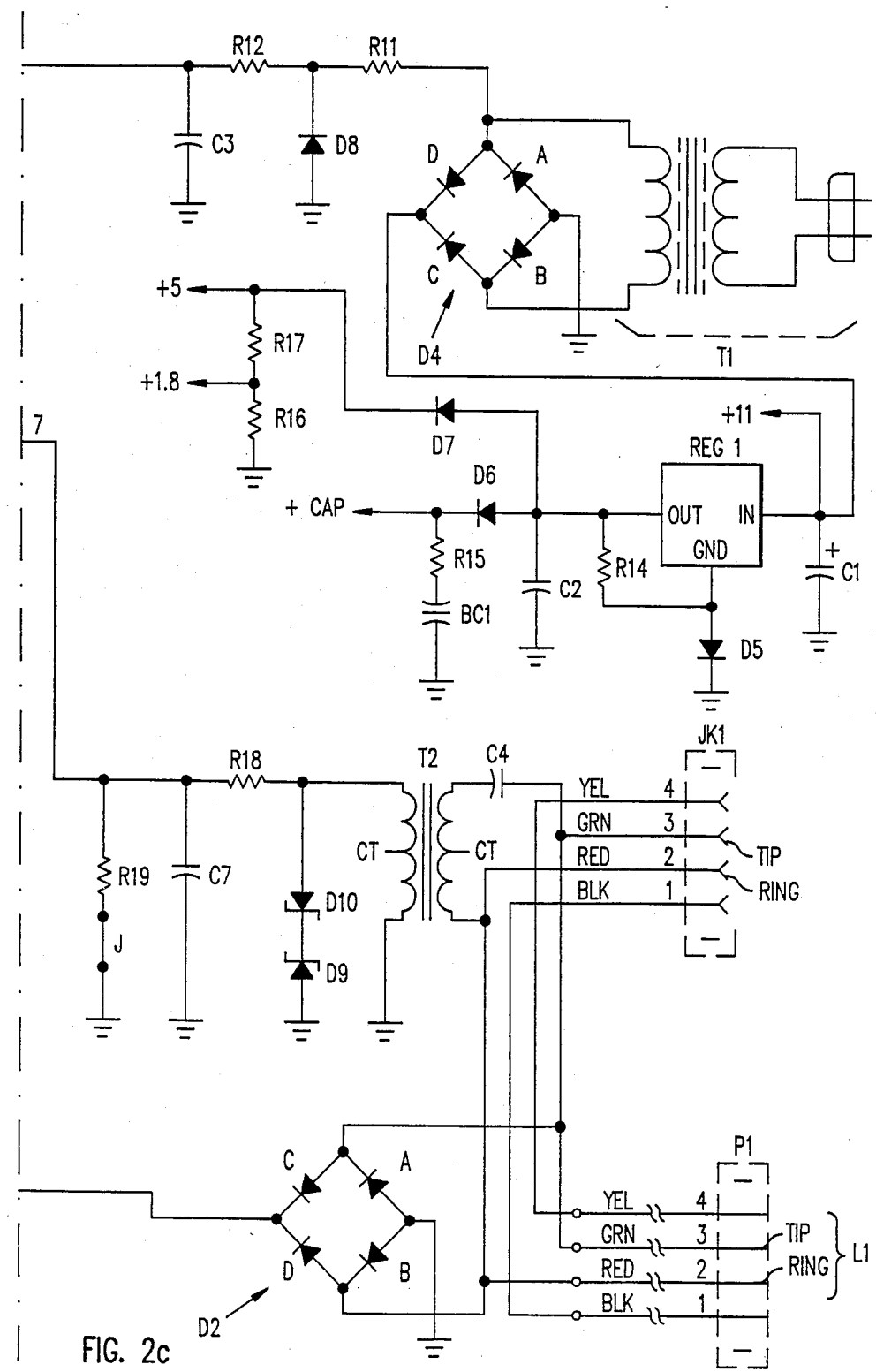
Figures 3, 3A:
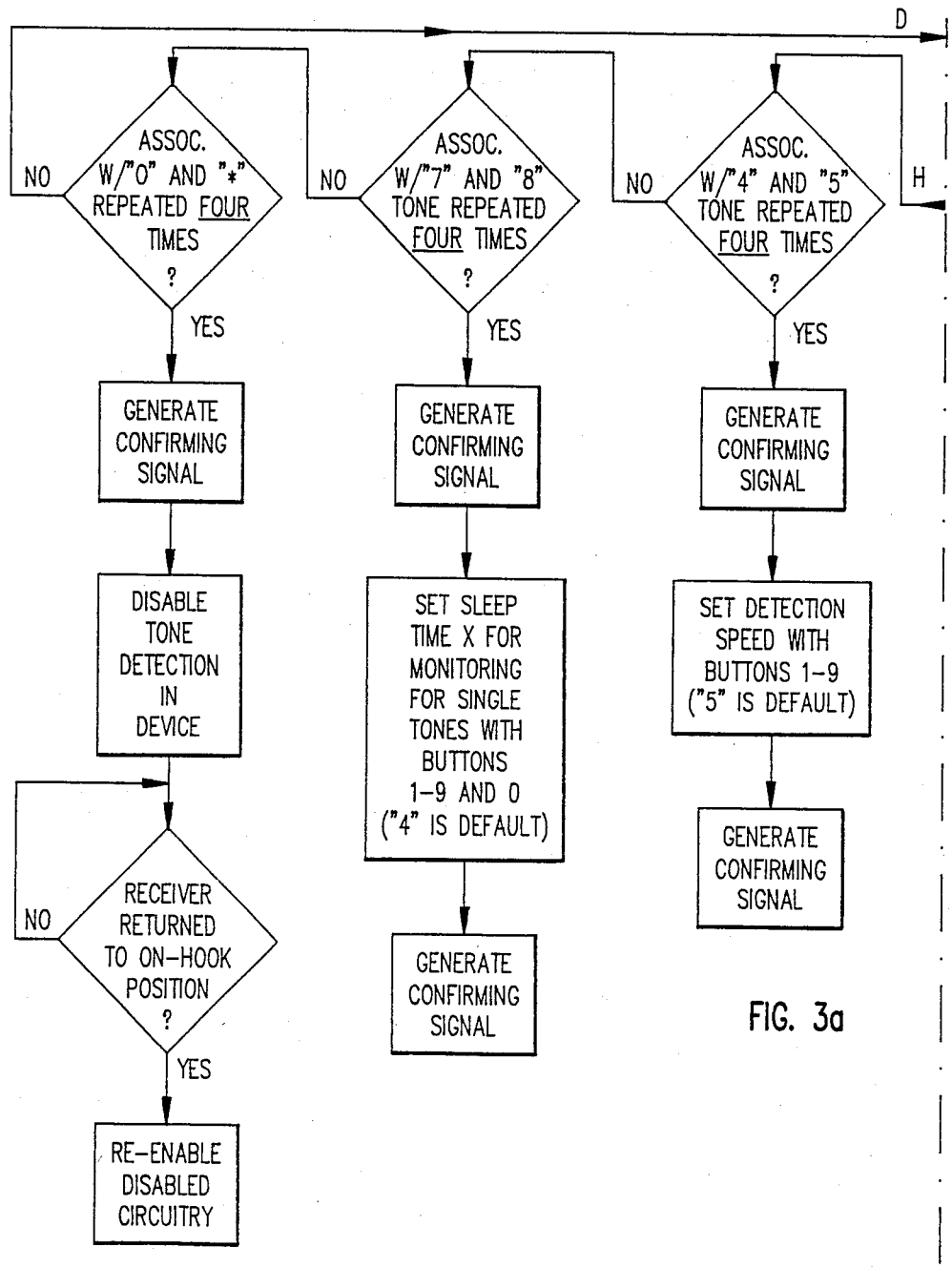
FIGS. 3a–3g form a flow chart depicting the operation of one embodiment of this invention.
Figure 3B:
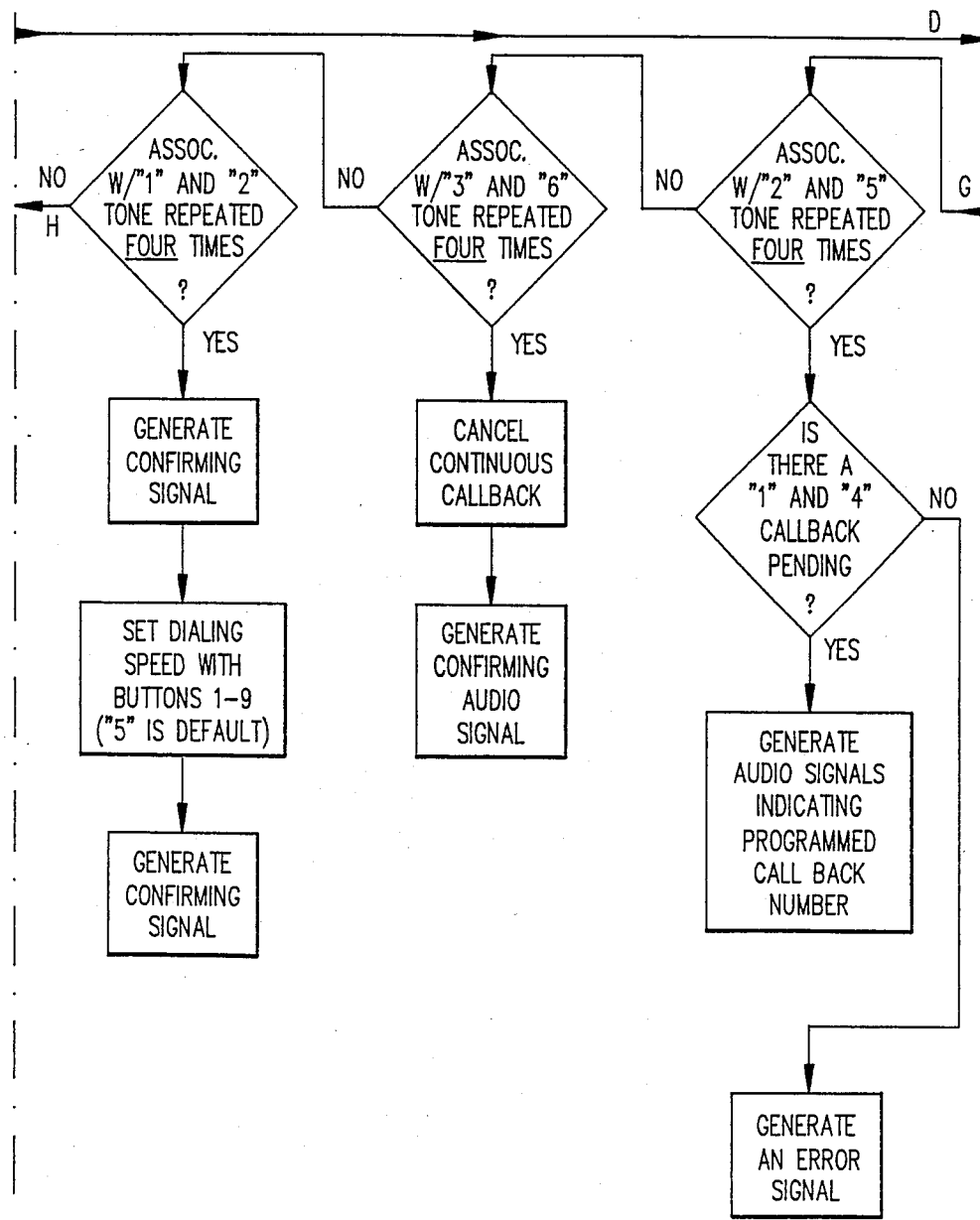
Figure 3C:
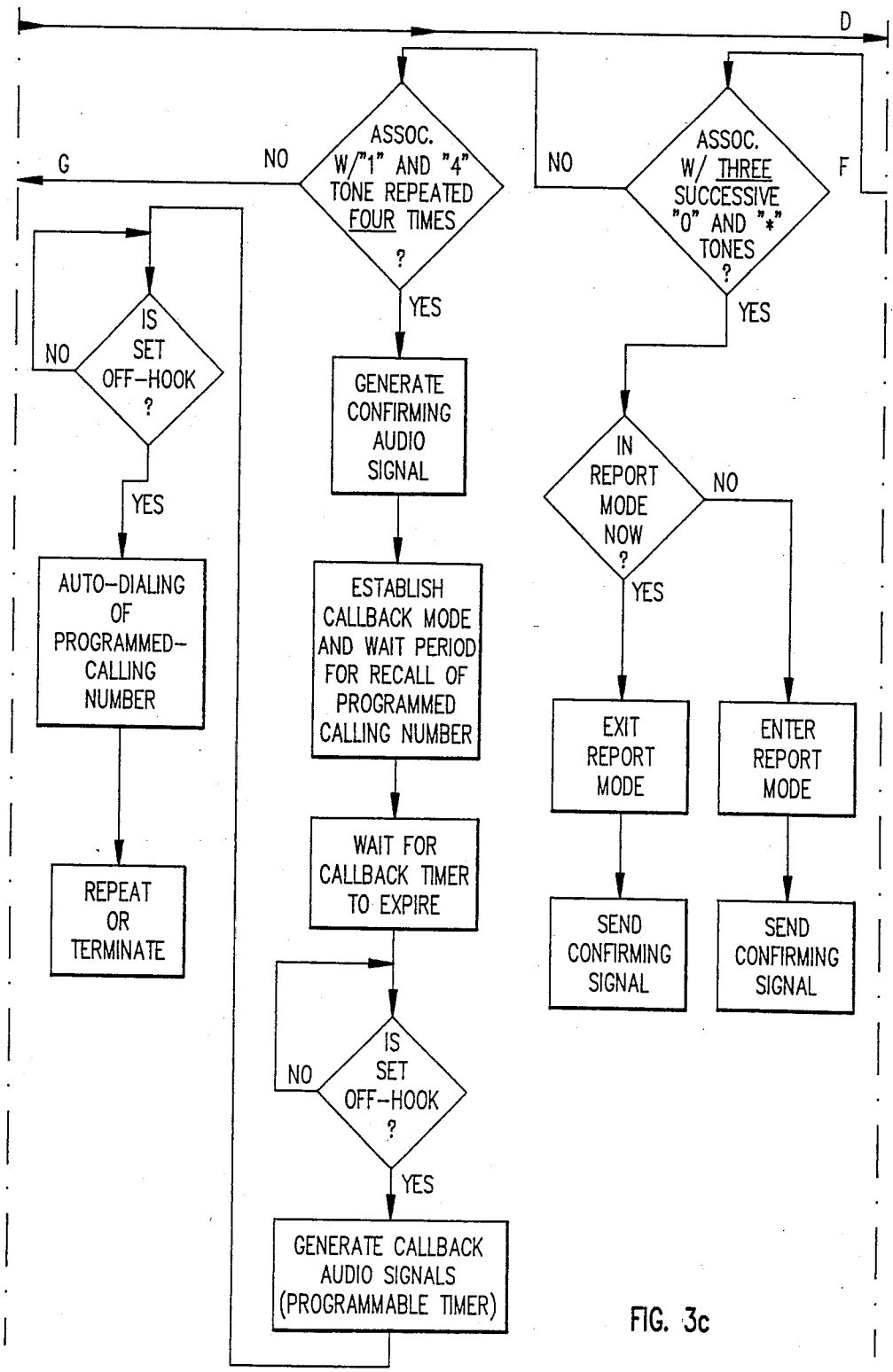
Figure 3D:
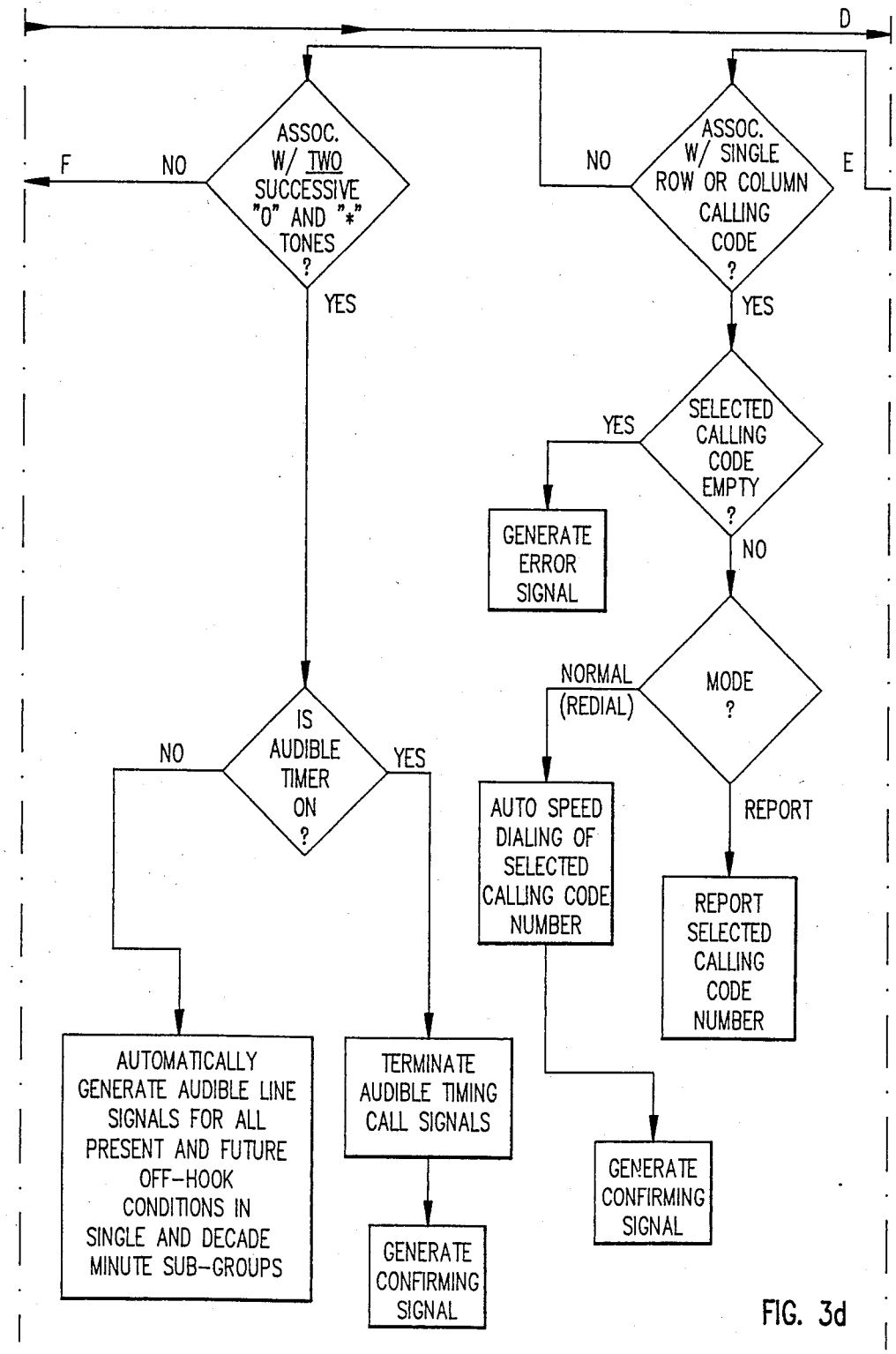
Figure 3E:
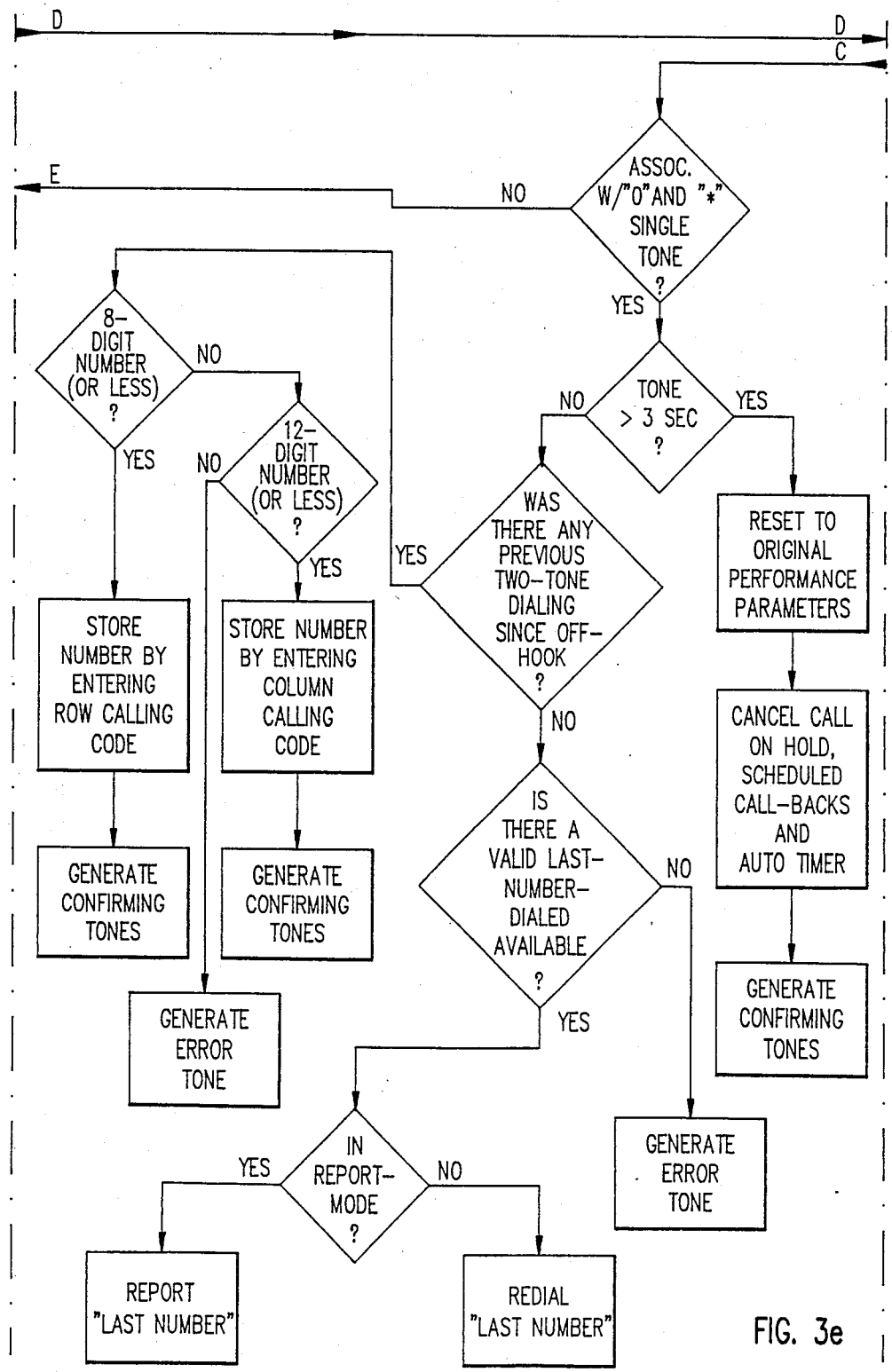
Figure 3F:
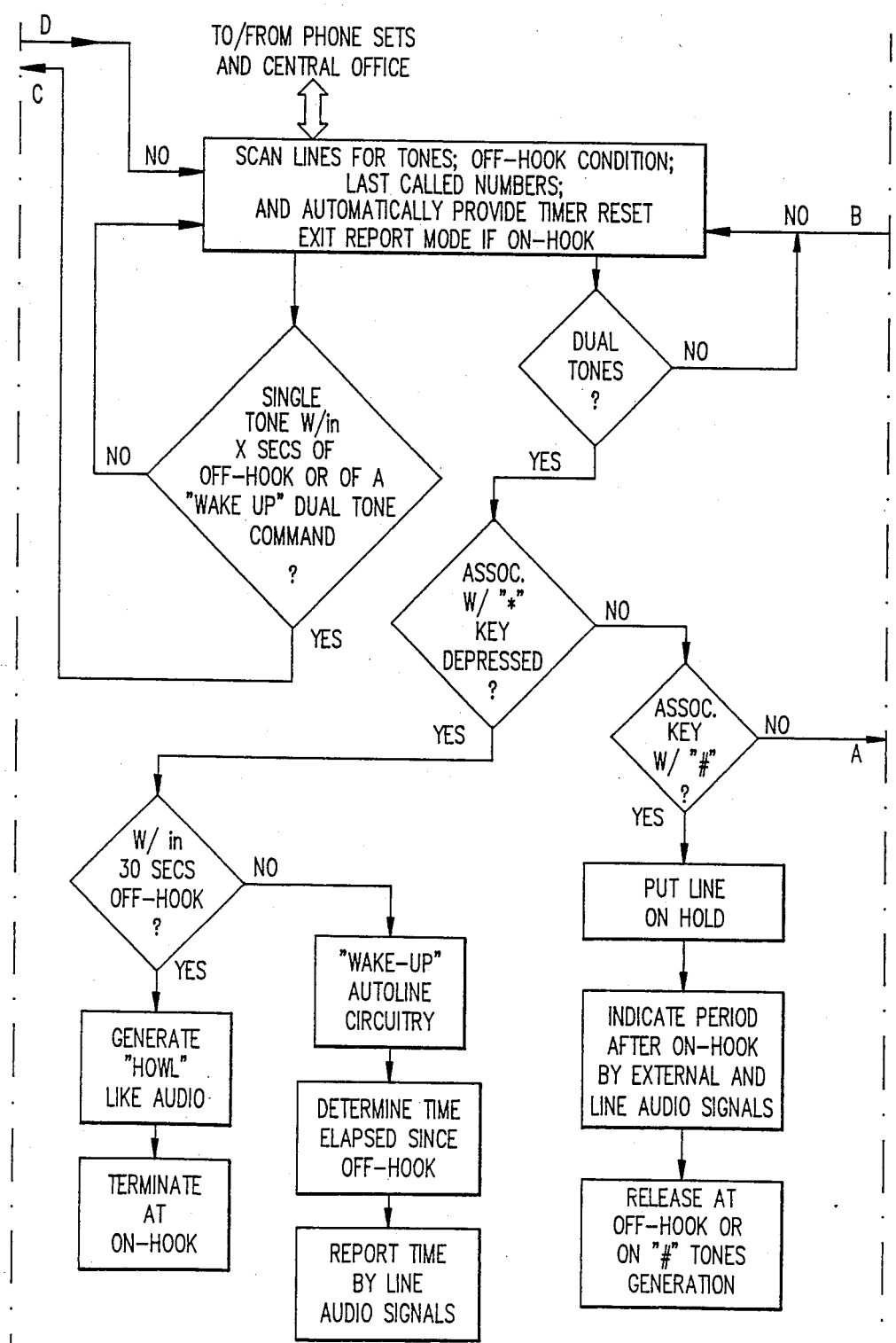
Figure 3G:
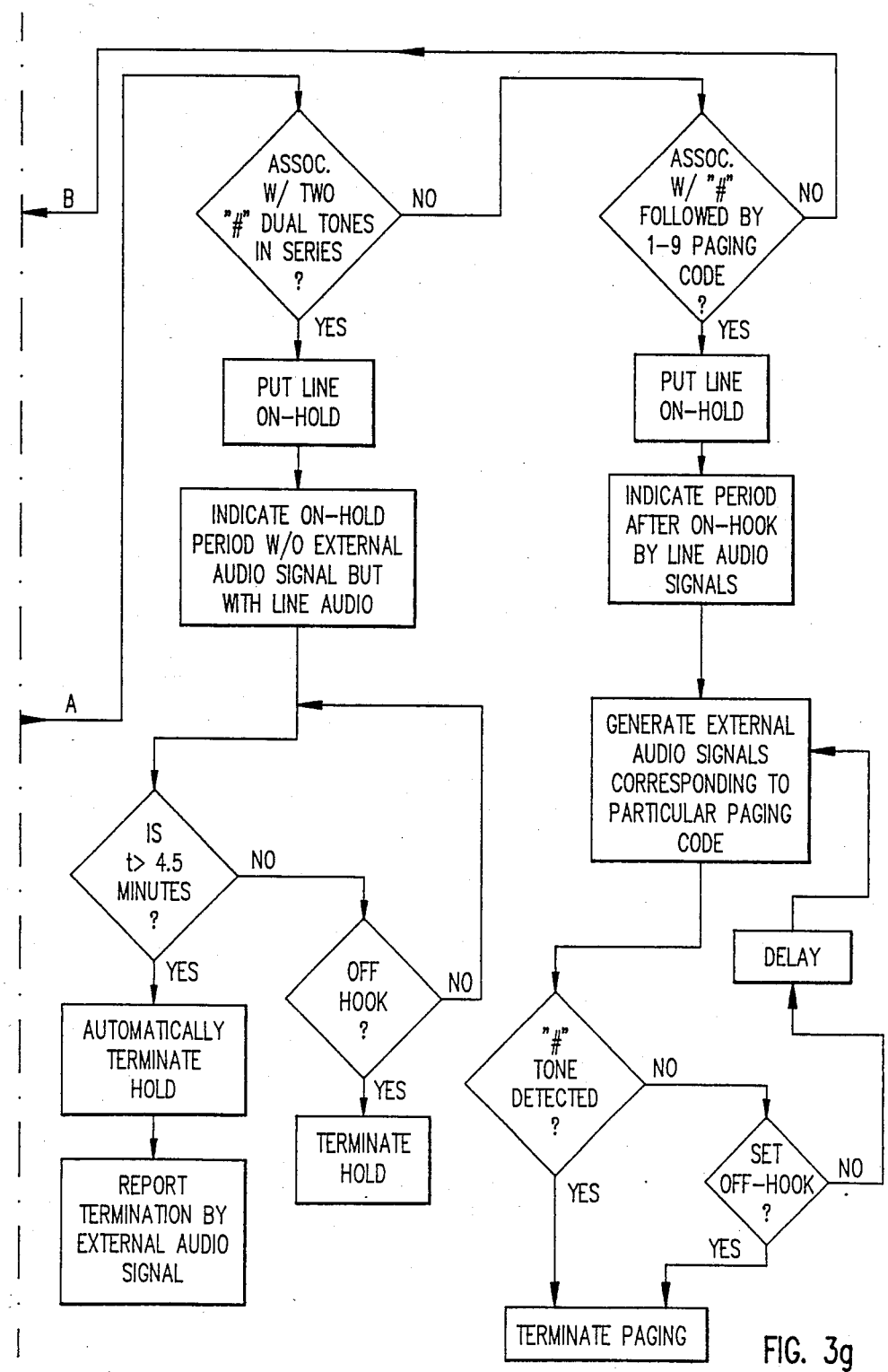

FIG. 2 is a schematic diagram of one embodiment of Remote Signalling Unit 18 constructed in accordance with the teachings of this invention. The remote signaling unit is a modified version of the circuit of FIG. 1. The remote signalling unit is also connected in parallel with the telephone line in the same manner as the circuit of FIG. 1, but is placed at another location in order to provide audible signals at locations too far away from the circuit of FIG. 1 to be heard otherwise.

When using the callback feature, and the time when the callback alarm is to be sounded occurs, it would be convenient if the main unit could send a signal over the telephone line (since no telephones are in use) to the remote unit which would cause the remote unit to begin audible signaling. Unfortunately, the FCC requires that, when no telephones are in use, no audio signals be sent onto the telephone line. Thus, the remote unit cannot be controlled by a simple audible signal which can be switched on and off remotely by the circuit of FIG. 1. Instead, the remote unit must have its own intelligence, timing circuits, and tone receivers in order to detect the entry of the original callback command and respond with an audible signal at the programmed time. Only audible signals are provided by the remote unit, all dialing tones and telephone-line tones are generated by the circuit of FIG. 1.

Therefore, the remote signaling unit is nearly identical to the circuit of FIG. 1. In order to reduce costs, the DTMF tone generator and related components, are not included in the remote unit. Further cost-reduction is accomplished in this embodiment by having the circuit of FIG. 1 "echo" received single-tone commands relevant to remote operation in dual-tone form so that the single-tone detectors and related components are not needed in the remote unit.

Minor differences in programming between the main and remote units are accomodated in this embodiment by providing an external jumper wire to the microprocessor which can be set to either of two positions, to tell the microprocessor whether it should behave as a main unit (FIG. 1) or as a remote unit (FIG. 2).

OPERATION DESCRIPTION

Once, installed, the device of this invention continuously monitors a telephone line. In so doing, it provides automatic calling features to any and all compatible tone-dialing telephones connected to the telephone line.

Whenever the receiver of any tone-dialing telephone connected to the telephone line is lifted, electronic calling is automatically and instantly available. The telephone pushbuttons, which are normally used only for dialing, now also serve as a means to operate additional functions. The (*) and (#) pushbuttons have special uses. Also, a new method of dialing is provided where two buttons are pressed at the same to send instructions to the device.

In one embodiment of this invention, in response to user commands, selected tones are placed on the telephone line in order that they may be heard by the user as confirmation that this command has been accepted. The operation of one embodiment of the present invention is now explained with reference to the flow chart of FIGS. 3a–3g.

IMMEDIATE ACTION COMMANDS

The action requested by each of the commands listed in this category will occur immediately following the completion of the command entry.

| | |
|---|---|
| HOWL - (press *) | The HOWL command causes a loud alternating tone on the telephone line. This unpleasant noise can be used to discourage nuisance or obscene telephone calls. HOWL must be used within the first 30 seconds of a call. |
| WAKEUP - (press *) | The WAKEUP command restores the ability of a "sleeping" device to accept two-button commands. The device is factory set to ignore two-button commands 18 seconds after calls begin. This is referred to as "falling asleep" and serves a protection against false tone recognition due to speech. If, after 18 seconds on a call, it is desired to enter a two-button command, such as AUTO-CALLING the device must be awakened with a WAKEUP command. Each time the unit is "awakened," it will respond immediately with a report of the elapsed time of the call. The time report occurs only once at the time of WAKEUP, and it is exactly the same as the report provided by the AUDIBLE TIMER command. WAKEUP must not be used until after 30 seconds on a call. |
| REDIAL - (press * and 0 simultaneously) | The REDIAL command causes an instant redial of the last telephone call made on the telephone line. REDIAL will use the last telephone number called, regardless of whether it was dialed manually using the pushbuttons or whether it was dialed automatically by the device. |
| AUDIBLE TIMER - (press * and 0 simultaneously, twice) | The AUDIBLE TIMER/SILENT TIMER command enables automatic reports of the length of telephone calls. when enabled, each call is timed, beginning when the receiver is lifted off-hook. The first entry of this command enables the AUDIBLE TIMER; the second entry of this command enables SILENT TIMER; and the third entry of this command re-enables AUDIBLE TIMER and so on in a toggling fashion. If AUDIBLE TIMER is enabled, a series of soft beeps indicating the length of the call will be heard on the users telephone once each minute. This series of beeps is a combination of long and short tones which indicate the amount of time since the receiver was first lifted off hook. The tones sound once every minute, with long beeps indicating ten minutes of conversation and short beeps indicating single minutes of conversation. For example, three long beeps followed by four short beeps would mean thirty-four minutes since the call had begun. The maximum call length reported is 60 minutes, after which a new 60 minute reporting sequence automatically begins. |
| SILENT TIMER - | If SILENT TIMER is enabled, call timing continues silently, and the once-a-minute beeps are shut off. However, at any time after 30 seconds on a telephone call, the user may request a single report of the elapsed time by issuing a WAKEUP command. The response to a WAKEUP command is the same long beep/short beep tone sequence described above, indicating the length of the call. |
| AUDIBLE HOLD - (press #) | The AUDIBLE HOLD command allows the receiver to be placed on-hook without disconnecting the party with whom the user is talking. Once this command is entered, the party on the other end of the line will hear a soft beep approximately once every two seconds. Also, once the users receiver is hung up, loud beeps will be emitted from the piezoelectric beeper of the device. The user can reconnect with the holding party and automatically cancel all beeping by lifting the receiver of any telephone on his telephone line. |
| SILENT HOLD - (press # twice rapidly) | The SILENT HOLD command causes the same action as the AUDIBLE HOLD, with the exception that no loud beeps are emitted from the device. Four and one-half minutes after enabling SILENT HOLD, the telephone line will be released and the party on HOLD will be disconnected. At this time five beeps will be emitted as notification that the telephone call has been terminated. |
| PAGING - (press # and a selected one of digits 1–9) | The PAGING command causes a series of beeps to be emitted from the piezoelectric beeper of the device as an audible paging signal. The number of beeps emitted depends upon the paging command entered. By assigning different numbers of beeps to different people, the command entered selects the person called to the telephone. Also, while the paging beeps |

| | |
|---|---|
| RESET - (press * and 0 simultaneously for at least 3 seconds) | are being sounded, the telephone line is automatically placed on HOLD so that the user is free to hang up the receiver. When either the user, or the person being paged, again lifts the receiver, both the paging beeps and HOLD are automatically shut off. The RESET command causes all optional performance adjustments to be returned to their original factory settings. RESET also cancels SILENT and AUDIBLE HOLDS and SCHEDULED CALL-BACKS and quiets the automatic call timer. RESET will not disturb any of the telephone numbers stored for automatic calling. |

SCHEDULED ACTION COMMANDS

The Principal Actions Requested by Commands of This Category Occur After a Prescheduled Interval

| | |
|---|---|
| SCHEDULE CALLBACK- (press 1 and 4 simultaneously four times, enter the value of the time period desired [followed by # to enable once-only callback]) | The SCHEDULE CALLBACK command is used to automatically redial, after a specified period of time, the last number called on the telephone line. The user can select either a once-only CALLBACK or a continuing CALLBACK.<br>  Once the SCHEDULE CALLBACK command has been entered, telephone calls may be placed and received as usual. Telephone calls made while a CALLBACK is pending will in no way affect the telephone number to be recalled or the time to wait until the CALLBACK is performed.<br>  Each time the receiver is lifted off hook while a CALLBACK is pending, three rapid beeps will be sounded as a reminder that a SCHEDULED CALLBACK is pending. If the user forgets the telephone number being recalled, the REPORT CALLBACK command may be used to determine the callback telephone number.<br>  After the SCHEDULED CALLBACK time has elapsed, loud beeps are sounded by the devices's PIEZO buzzer to indicate that SCHEDULED CALLBACK is about to take place. The loud beeps will be sounded by both the device itself and all REMOTE SIGNALING DEVICES. If a once-only SCHEDULED CALLBACK has been selected, the loud beeps will continue to sound until the receiver is lifted off hook. After lifting the receiver, the SCHEDULED CALLBACK will proceed by automatically dialing the call. However, SCHEDULED CALLBACK is cancelled if the receiver is immediately returned to the hook either before or during automatic dialing.<br>  If continuing SCHEDULED CALLBACK mode has been selected, the loud beeps will be sounded for thirty seconds. During this thirty second period, the telephone receiver may be lifted off hook as described above for the once-only SCHEDULED CALLBACK. If, however, it is desired to wait until the next callback period elapses, the user does not lift the receiver, or lifts and replaces the telephone receiver immediately. If the receiver is not lifted after thirty seconds of beeping, beeping will cease and another callback interval will begin to be timed. At the completion of the new callback interval, the thirty second beeping will begin again. This cycle will continue indefinitely until a CANCEL CALLBACK command is entered. Normal call completion will not cancel a SCHEDULED CALLBACK; CALLBACKs will continue until a CANCEL CALLBACK command is specifically issued.<br>  If the telephone line is in use at the time a CALLBACK is to occur, the beeping alert is delayed until the telephone is hung up. Once the telephone line is free, the normal beeping sequence will begin in order to alert that the SCHEDULED CALLBACK is ready to proceed. |
| REPORT CALLBACK - (press 2 and 5 simultaneously, four times) | The REPORT CALLBACK command causes a sequence of beeps to be sounded on the telephone line which reports the number to be recalled by a SCHEDULED CALLBACK.<br>  As an example of a count off report, if the number to be recalled is 555-4321 when REPORT CALLBACK is entered, the following series of beeps is produced on the line:<br>  5 beeps - pause - 5 beeps pause - 5 beeps - pause - 4 beeps - pause - 3 beeps - pause - 2 beeps - pause - 1 beep. |
| CANCEL CALLBACK - (press 3 and 6 simultaneously, four times) | The CANCEL CALLBACK command cancels or stops SCHEDULED CALLBACKs. This is the only way to cancel continuous CALLBACKs, except for RESET. |

MEMORY ACCESS COMMANDS

The Principal Actions of Command of This Category Concern Programmed Telephone Numbers Eighteen programmed telephone numbers can be stored and instantly recalled and dialed by the device. Before the AUTOCALLING feature can be used, however, the telephone numbers must be programmed into memory. The 18 available telephone number memories are arranged as nine LOCAL and nine TOLL memories, each of which is selected by a unique two button command.

The nine LOCAL AUTOCALL memories are each limited to a telephone number of 8 digits maximum length. Each of the LOCAL AUTOCALL memories is selected by simultaneously pressing two horizontally adjacent buttons on the telephone, as shown in Table 1:

TABLE 1

| Local Autocalls | |
|---|---|
| Memory Location | Two Button Code |
| 1 | 1 and 2 (enter once) |
| 2 | 1 and 2 (enter twice) |
| 3 | 1 and 2 (enter three times) |
| 4 | 4 and 5 (enter once) |
| 5 | 4 and 5 (enter twice) |
| 6 | 4 and 5 (enter three times) |
| 7 | 7 and 8 (enter once) |
| 8 | 7 and 8 (enter twice) |
| 9 | 7 and 8 (enter three times) |

The nine TOLL AUTOCALL memories are each limited to a telephone number of 12 digits maximum length. Each of the TOLL AUTOCALL memories is selected by simultaneously pressing two vertically adjacent buttons on the telephone, as shown in Table 2:

TABLE 2

Toll Autocalls

| Memory Location | Two Button Code |
|---|---|
| 1 | 1 and 4 (enter once) |
| 2 | 1 and 4 (enter twice) |
| 3 | 1 and 4 (enter three times) |
| 4 | 2 and 5 (enter once) |
| 5 | 2 and 5 (enter twice) |
| 6 | 2 and 5 (enter three times) |
| 7 | 3 and 6 (enter once) |
| 8 | 3 and 6 (enter twice) |
| 9 | 3 and 6 (enter three times) |

| | |
|---|---|
| LEARN LOCAL AUTOCALL | |
| LEARN TOLL AUTOCALL - <br> (1) Dial telephone number to be programmed. <br> (2) Press * and 0 simultaneously to enable <br> (3) Enter two button sequence to select memory location | The LEARN LOCAL AUTOCALL and LEARN TOLL AUTOCALL commands are very similar and are each used for programming telephone numbers. The nine telephone numbers programmed with LEARN LOCAL AUTOCALL must each be no more than eight digits in length; the nine telephone numbers programmed with LEARN TOLL AUTOCALL must each be no more than twelve digits in length. Local numbers may also be programmed into the TOLL AUTOCALL memories if more local, and less toll, number storage is desired. <br><br> Occasionally, a user may pause too briefly between button pushes or release the buttons too rapidly when entering commands. In such instances, commands may be misinterpreted and a number stored in the wrong memory location. Response beeps are provided as confirmation of where a "learned" number has been stored. If an error should occur, both the erroneously stored memory location and the originally intended memory location must be reprogrammed correctly. <br><br> A number programmed into a given memory location will remain there indefinitely, until that memory location is reprogrammed or until power is lost for typically more than three days. |
| REPORT AUTOCALL CONTENTS - (press * and 0 simultaneously, three times. Then enter the desired keypad setting from either Table 1 or Table 2 | The REPORT AUTOCALL CONTENTS command causes a sequence of beeps to be sounded on the telephone line which reports the telephone number assigned to particular LOCAL AUTOCALL or AUTOCALL memory location. The last number dialed can also be reported. |

PERFORMANCE ADJUSTMENT COMMANDS

The Principal Actions of the Commands of This Category Affect Operating Parameters of the Device.

| | |
|---|---|
| SET DIALING SPEED - (press 1 and 2 simultaneously, four times. Then enter the desired keypad setting from Table 3.) | The SET DIALING SPEED command is used to set the rate at which dialing tones are generated. If calls automatically dialed frequently "go nowhere" or result in wrong numbers, the DIALING SPEED can be set to a higher setting in order to increase the amount of time during which each dialing tone is sounded and thereby allow for more accurate tone recognition by telephone company equipment. <br> Table 3 below lists the tone-on time, in milliseconds, for each of the DIALING SPEED settings. The intertone quiet time is the same as the active tone-on time, resulting in a 50% duty cycle. |

TABLE 3

DIALING SPEED SETTINGS

| KEYPAD SETTING | TONE-ON TIME (mSEC) |
|---|---|
| 1 | 35 |
| 2 | 40 |
| 3 | 45 |
| 4 | 50 |
| 5 (default) | 55 |
| 6 | 65 |
| 7 | 75 |
| 8 | 85 |
| 9 | 95 |

| | |
|---|---|
| SET DETECTION SPEED - (press 4 and 5 simultan- | The SET DETECTION SPEED command establishes how long |

| eously, four times. Then press the desired keypad setting from Table 4.) | two button commands must be entered before they are recognized. Table 4 below lists the detection speed settings, in milliseconds. |
|---|---|

TABLE 4
DETECTION SPEED SETTINGS

| KEYPAD SETTING | TONE-ON TIME (mSEC) |
|---|---|
| 1 | 35 |
| 2 | 50 |
| 3 | 65 |
| 4 | 85 |
| 5 (default) | 100 |
| 6 | 125 |
| 7 | 150 |
| 8 | 250 |
| 9 | 320 |

| SET SLEEP TIME - (press 7 and 8 simultaneously, four times. Then enter the desired keypad setting from Table 5.) | The SET SLEEP TIME command establishes the period of time, after the receiver is lifted off hook during which two button commands are recognized. Entering a 0 disables the sleep function, thereby leaving two button commands enabled at all times. |
|---|---|

TABLE 5
SLEEP TIME SETTINGS

| KEYPAD SETTING | FALL ASLEEP TIME (SECONDS) |
|---|---|
| 1 | 3 |
| 2 | 7 |
| 3 | 12 |
| 4 (default) | 18 |
| 5 | 25 |
| 6 | 33 |
| 7 | 42 |
| 8 | 52 |
| 9 | 90 |
| 0 | infinity |

| SHUTDOWN - (press * and 0 simultaneously, four times) | The SHUTDOWN command immediately disables all functions for the duration of the call in progress, as may be needed for telephone banking or electronic data communications. SHUTDOWN is disabled when a call is completed by hanging up the receiver. |
|---|---|

AUTOCALLING COMMANDS

The Principal Action of the Commands in This Category is the Immediate Autodialing of a Programmed Telephone Number.

| LOCAL AUTOCALLING and TOLL AUTOCALLING - (enter the 2 button code from Table 1 or Table 2) | The AUTOCALLING command is simply the code (see Table 1 and Table 2) defining which memory location contains the telephone number to be dialed. The AUTOCALLING command causes an immediate speed dial any of the 18 preprogrammed telephone numbers. If an AUTOCALLING code memory location is selected which contains no preprogrammed telephone number, one long, low pitched tone sounds on the telephone line, and no dialing takes place. |
|---|---|

TONE DIALING AND THE DEVICE

The pushbuttons on tone-dialing telephones are arranged in four rows and three columns. When any one of these buttons is depressed, two different tones are simultaneously produced by the telephone. One of the tones indicates the row containing the depressed button, and the other tone indicates the column. The telephone, therefore, produces only seven different tones, one for each column and one for each row. As an example, depressing [4] causes the telephone to simultaneously produce the column-1 and row-2 tones.

On most tone-dialing telephones, pressing two buttons together within a single row, such as [1] and [2], or two buttons together within a single column, such as [1] and [4], produces only one tone. The tone produced is the tone which corresponds with the row or column in which the two pressed buttons are located. The single tone, because it is very similar to human speech sounds, is ignored by the telephone company tone dialing receiver circuits. Therefore, pressing two buttons within the same column or row will produce tones which do not affect telephone company equipment. Such tones, however, *are monitored* by the device constructed in accordance with the teachings of this invention in order to convey commands.

Dual tones, which are produced when a single button is pressed, are present during normal push button dialing and are also monitored by the device and interpreted as dialed telephone numbers or command entries.

UNEXPECTED OR UNDESIRED DIALING: TALK-OFF

In accordance with the teachings of this invention, a telephone line is monitored for the presence of specific, pure single tones. Such pure tones, once detected as present for as little as 35/1000 of a second, act as commands. However, human speech can also create such pure tones. Sounds such as "aah", "ooh", "mmm" and others, depending on the person speaking, may cause unexpected, and undesired, automatic action when an appropriate tone is present in the speech on the telephone line. Such unexpected action is referred to as TALK-OFF.

Two adjustable performance features are provided in order to minimize TALK-OFF. These features are factory set to achieve rapid command recognition but yet maintain an acceptable level of protection against TALK-OFF. If TALK-OFF occurs, the unit's command sensitivity can be adjusted in order to further increase TALK-OFF protection. SET DETECTION SPEED and SET SLEEP TIME can be set to minimize TALK-OFF in exchange for slightly slower responses to two-button commands.

One embodiment of this invention, the components shown in FIGS. 1 and 2 are as follows.

TABLE

| Component No. | Part No. or Component Value | Manufacturer |
|---|---|---|
| T1 | P35F-F150-1A/2 | Multi Products International Cedar Grove, NJ |
| T2 | 600 ohm to 600 ohm | |

TABLE-continued

| Component No. | Part No. or Component Value | Manufacturer |
|---|---|---|
| BC1 | Audio Isolation Transformer LP055473A .047 F Memory backup cap. | SoHio Engineered Materials Co. Niagara Falls, NY |
| P1 | 4-conductor cord, Modular plug to stripped ends | |
| JK1 | 60067 Modular jack, 4-contacts | Burndy |
| Y1 | 3.579545 MHz Crystal | |
| Y2 | CSA 3.58. MG Ceramic Resonator | Murata-Erie North America, Marietta, GA |
| TP1 | Test Terminal | |
| PB1 | PKB8-4A0 Piezo Buzzer | Murata-Erie North America Marietta, GA |
| S1 | SPST Pushbutton Switch, Normally open | |
| U1 | HD6305V0P CMOS Microcomputer | Hitachi America, LTD. San Jose, CA |
| U2 | S25089 DTMF Generator | AMI (Gould-AMI Semiconductors) Santa Clara, CA |
| U3 | SSI204ACP DTMF Decoder | Silicon Systems, Inc. Tustin, CA |
| U4 | MC14011BCP CMOS Quad Nand | Motorola Phoenix, AZ |
| U5 | 74LS93 4-bit binary counter | Texas Instruments Dallas, TX |
| U6 | LM324N Quad Op-AMP | National Semiconductor Santa Clara, CA |
| U7 | MT8865XE DTMF Bandsplit Filter | Mitel Semiconductor Kanata, Ontario, Canada |
| U8 | MC14011BCP CMOS Quad Nand | Motorola Phoenix, AZ |
| Reg 1 | 78M05 Voltage Regulator | National Semiconductor Santa Clara, CA |
| Q1 | MPS-A42 NPN Transistor | Motorola Phoenix, AZ |
| Q2 | MPS-A13 NPN Darlington | Motorola Phoenix AZ |
| Q3 | 2N3904 NPN Transistor | |
| Q4 | IRFD1Z3 N-Channel Power Mosfet | International Rectifier El Segundo, CA |
| D1 | 1N4742 Zener diode 12 V, 1 W | |
| D2A-D | 1N4007 Diode 1000 V, 1 A | |
| D3 | 1N4148 Diode 75 V, 200 mA | |
| D4A-D | 1N4002 Diode 100 V, 1 A | |
| D5 | 1N4148 Diode 75 V, 200 mA | |
| D6 | 1N4148 Diode 75 V, 200 mA | |
| D7 | 1N4002 Diode 100 V, 1 A | |
| D8 | 1N4148 Diode 75 V, 200 mA | |
| D9 | 1N4733 Zener diode 5.1 V, 1 W | |
| D10 | 1N4733 Zener diode 5.1 V, 1 W | |
| D11 | 1N4148 Diode 75 V, 200 mA | |
| D12 | 1N4148 Diode 75 V, 200 mA | |
| D13 | 1N4148 Diode 75 V, 200 mA | |
| D14 | 1N4148 Diode 75 V, 200 mA | |
| C1 | 470 uF/16 V | |
| C2 | 2.2 uF/50 V | |
| C3 | .1/50 V | |
| C4 | .47/400 V | |
| C5 | .1/50 V | |
| C6 | .001/200 V | |
| C8 | .01/25 V | |
| C9 | .33/50 V | |
| C10 | 680 pF/500 V | |
| C11 | 680 pF/500 V | |
| C12 | 2.2 uF/50 V | |
| C13 | 27 pF/500 V | |
| C14 | 27 pF/500 V | |
| C15 | 27 pF/500 V | |
| C16 | 27 pF/500 V | |
| C17-C20 | not used | |
| C21-C22 | .1/50 V | |
| C23 | not used | |
| C24-C28 | .1/50 V | |
| R1 | 47, ¼ W, 5% | |
| R2 | 47, ¼ W, 5% | |
| R3 | 330 | |
| R4 | 22 M | |
| R5 | 240K | |
| R6 | 270 | |
| R7 | 10K | |
| R8 | 270K | |
| R9 | 3.9K | |
| R10 | 3.3K | |
| R11 | 5.1K | |
| R12 | 5.1K | |
| R13 | 100K | |
| R14 | 2.2K | |
| R15 | 150 | |
| R16 | 5.6K | |
| R17 | 10K | |
| R18 | 10K | |
| R19 | 5.1K | |
| R20 | 5.1K | |
| R21 | 2.0 M | |
| R22 | 10K | |
| R23 | 22K | |
| R24 | 4.7K | |
| R25 | 4.7K | |
| R26 | 10K | |
| R27 | 10K | |
| R28 | 100K | |
| R29 | 10K | |
| R30 | 10K | |
| R31 | 10 M | |
| R32 | 10K | |
| R33 | 10K | |
| R34 | 10K | |
| R35 | 470K | |
| R36 | 1.0 M | |

The specific embodiments of this invention described in this specification are intended to serve by way of example and are not a limitation on the scope of the instant invention. Numerous other embodiments of this invention will become apparent to those of ordinary skill in the art in light of the teachings of this invention.

We claim:

1. A telephone control system comprising:
    means for connection in parallel with a subscriber's tone-dialing DTMF telephone set connected to a conventional telephone line comprising tip and ring conductors;
    means for decoding DTMF dual-tones on said telephone line;
    means for decoding DTMF single tones on said telephone line;
    an off-hook detector connected to said telephone line to selectively detect off-hook DC current;
    a parallel load holding circuit connected to said telephone line for selectively providing an off-hook local loop transparent condition;

a selectively controlled tone generator connected to said telephone line; and a processor for assimilating data from said means for decoding DTMF dual-tones, said means for decoding DTMF single tones and said off-hook detector, said processor controlling said tone generator, and said holding circuit in response thereto, to provide the functions listed above without affecting said local line switching and tone generating equipment.

2. The telephone control system of claim 1 wherein memory dialing is provided to all tone-dialing telephones on said telephone line.

3. The telephone control system of claim 1 wherein said means for decoding single tone detection comprises:

a high group/low group filter for providing a high group output signal and a low group output signal;

a digital period counter; and means for selectively applying said high group output signal and said low group output signal to said digital period counter;

wherein said processor performs an evaluation of the results of said period counter to decode valid single tones.

4. The telephone control system of claim 1 which provides, for all tone-dialing telephones on said telephone line, automatic redialing of the last telephone number called on said telephone line.

5. The telephone control system of claim 1 which provides, for all tone-dialing telephones on said telephone line, signal to a user to pick up a telephone at a prearranged time and automatic tone-dialing of a selected telephone number when the user picks up a telephone.

6. The telephone control system of claim 1 which provides, for all tone-dialing telephones on said telephone line, a "hold" function.

7. The telephone control system of claim 1 which provides, for all tone-dialing telephones on said telephone line, a "paging" function.

8. The telephone control system of claim 1 which provides, for all tone-dialing telephones on said telephone line, a "howl" function.

9. The telephone control system of claim 1 which provides, for all tone-dialing telephones on said telephone line, timing of the length of telephone calls.

10. The telephone control system of claim 1 which further comprises a remote circuit connected in parallel to said telephone line, said remote circuit including a separate processor circuit for monitoring said telephone line for dual frequency tones and controlling an external signaling device.

11. The telephone control system of claim 10 wherein said external signaling device operates in response to signal tones associated with callback, paging or hold functions.

12. The telephone control system of claim 11 wherein said external signaling device is an audio signaling device.

13. The telephone control system of claim 1 which further comprises an external signaling device operating in response to paging or hold functions.

14. The telephone control system of claim 13 wherein said external signaling device is an audio signaling device.

* * * * *